US008559039B2

(12) United States Patent
Toda et al.

(10) Patent No.: US 8,559,039 B2
(45) Date of Patent: Oct. 15, 2013

(54) IMAGE FORMING APPARATUS AND METHOD FOR GENERATING USER INFORMATION

(75) Inventors: Yoshiyuki Toda, Kanagawa (JP); Yoshifumi Kawai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 169 days.

(21) Appl. No.: 13/116,820

(22) Filed: May 26, 2011

(65) Prior Publication Data

US 2011/0299115 A1 Dec. 8, 2011

(30) Foreign Application Priority Data

Jun. 4, 2010 (JP) ................................ 2010-129163

(51) Int. Cl.
*G06F 15/00* (2006.01)

(52) U.S. Cl.
USPC ........................................................ 358/1.15

(58) Field of Classification Search
USPC ........................................................ 358/1.15
See application file for complete search history.

(56) References Cited

U.S. PATENT DOCUMENTS

2006/0271781 A1 11/2006 Murakawa
2007/0050050 A1 3/2007 Tanida
2009/0268239 A1* 10/2009 Kawara ........................ 358/1.15
2010/0309512 A1* 12/2010 Onoda ......................... 358/1.15

FOREIGN PATENT DOCUMENTS

JP 2003-251897 9/2003
JP 2007-067875 3/2007
JP 4211760 1/2009

OTHER PUBLICATIONS

Machine translation for JP 2003-251897 (IDS).*
Begining SQL, Paul Wilton and John Colby, Mar. 2005, published by Wrox, ISBN:978-0-764-57732-1, p. 207-226.*

* cited by examiner

*Primary Examiner* — Qian Yang
(74) *Attorney, Agent, or Firm* — IPUSA, PLLC

(57) ABSTRACT

An image forming apparatus configured to be connected to one or more apparatuses through a network includes a user information storing unit to store local-apparatus user information about one or more users of the image forming apparatus, an apparatus information storing unit to store information indicative of the one or more apparatuses, a user information acquiring unit to acquire remote-apparatus user information from the one or more apparatuses indicated by the information stored in the apparatus information storing unit, and a user information integration unit to merge the local-apparatus user information and the remote-apparatus user information to generate display-purpose user information to be displayed on a screen, and to transmit the local-apparatus user information to the one or more apparatuses with a request to generate display-purpose user information.

15 Claims, 28 Drawing Sheets

| IP ADDRESS OF COORDINATED APPARATUS | FUNCITON1 | FUNCITON2 | FUNCTION3 |
|---|---|---|---|
| 133.139.23.29 (A) | COPY (VER3.0) | FAX (VER3.0) | PRINTER (VER3.0) |
| 133.139.23.141(B) | COPY (VER2.0) | SCANNER (VER2.4) | D-BOX (VER1.4) |
| 133.139.158.79(C) | SCANNER (VER3.0) | – | – |
| 133.139.138.169(D) | COPY (VER1.1) | PRINTER (VER1.1) | – |

FIG.13A

| ID | USER NAME | FAX NUMBER | MAIL ADDRESS | ... | IP ADDRESS |
|---|---|---|---|---|---|
| 001 | A | 03-0000-0000 | SPACE | ... | 133.139.23.29 |
| 002 | B | 06-0000-0000 | SPACE | ... | 133.139.23.29 |
| ... | ... | ... | ... | ... | ... |
| 001 | C | 03-1111-1111 | SPACE | ... | 133.139.23.141 |
| 002 | D | 06-1111-1111 | SPACE | ... | 133.139.23.141 |
| ... | ... | ... | ... | ... | ... |
| 001 | E | SPACE | eee@xxx.co.jp | ... | 133.139.158.79 |
| 002 | F | SPACE | fff@xxx.co.jp | ... | 133.139.158.79 |
| ... | ... | ... | ... | ... | ... |
| 001 | G | 03-2222-2222 | SPACE | ... | 133.139.138.169 |
| 002 | H | 06-2222-2222 | SPACE | ... | 133.139.138.169 |
| ... | ... | ... | ... | ... | ... |

| ID | USER NAME | FAX NUMBER | MAIL ADDRESS | ··· | IP ADDRESS | FAX NUMBER | IP ADDRESS |
|---|---|---|---|---|---|---|---|
| 001 | A | 03-0000-0000 | SPACE | ··· | 133.139.23.29 | 04-0000-0000 | 133.139.23.141 |

COMPARE

REMOVE OR ADD ATTRIBUTE

33

| ID | USER NAME | FAX NUMBER | FAX NUMBER | MAIL ADDRESS | ··· | IP ADDRESS |
|---|---|---|---|---|---|---|
| 001 | A | 03-0000-0000 | 04-0000-0000 | SPACE | ··· | 133.139.23.29 |

| ID | USER NAME | ACCOUNT INFORMATION | | PASSWORD | IP ADDRESS |
|---|---|---|---|---|---|
| | | FAX SETTING | FOLDER TRANSMISSION SETTING | | |
| 001 | A | aa | SPACE | AXXXX | 133.139.23.29 |
| 002 | B | bb | SPACE | BXXXX | 133.139.23.29 |
| ⋮ | ⋮ | ⋮ | ⋮ | ⋮ | ⋮ |
| 001 | C | SPACE | /PERSONAL_CABINET/WORK | CXXXX | 133.139.23.141 |
| 002 | D | SPACE | /PERSONAL_CABINET/WORK | DXXXX | 133.139.23.141 |
| ⋮ | ⋮ | ⋮ | ⋮ | ⋮ | ⋮ |
| 001 | E | ee | SPACE | EXXXX | 133.139.158.79 |
| 002 | F | ff | SPACE | FXXXX | 133.139.158.79 |
| ⋮ | ⋮ | ⋮ | ⋮ | ⋮ | ⋮ |
| 001 | G | gg | SPACE | GXXXX | 133.139.138.169 |
| 002 | H | hh | SPACE | HXXXX | 133.139.138.169 |
| ⋮ | ⋮ | ⋮ | ⋮ | ⋮ | ⋮ |

| ID | USER NAME | FAX NUMBER | MAIL ADDRESS | ··· | IP ADDRESS |
|---|---|---|---|---|---|
| 001 | A | 03-0000-0000 | NULL | ··· | 133.139.23.29 |
| 002 | B | 06-0000-0000 | NULL | ··· | 133.139.23.29 |
| 003 | C | 03-1111-1111 | NULL | ··· | 133.139.23.141 |
| 004 | D | 06-1111-1111 | NULL | ··· | 133.139.23.141 |
| 005 | E | NULL | eee@xxx.co.jp | ··· | 133.139.158.79 |
| 006 | F | NULL | fff@xxx.co.jp | ··· | 133.139.158.79 |
| 007 | G | 03-2222-2222 | NULL | ··· | 133.139.138.169 |
| 008 | H | 06-2222-2222 | NULL | ··· | 133.139.138.169 |
| ⋮ | ⋮ | ⋮ | ⋮ | ⋮ | ⋮ |

| ATTRIBUTE | RELEVANT FUNCTION | COMPATIBILITY |
|---|---|---|
| ACCOUNT IDENTIFIER | – | – |
| ACCOUNT NAME | – | – |
| UPDATE DATE AND TIME | – | – |
| CREATION DATE AND TIME | – | – |
| FAX TRANSMISSION MODE | FAX (VER1.0) | COMPATIBLE UP TO VER1.0 |
| FAX COMMUNICATION LINE TYPE | FAX (VER1.0) | COMPATIBLE UP TO VER1.0 |
| FOLDER TRANSMISSION PROTOCOL TYPE | FOLDER TRANSMISSION (VER2.1) | VALID ONLY FOR VER2.1 |
| FOLDER TRANSMISSION PATH | FOLDER TRANSMISSION (VER2.1) | – |
| ⋮ | ⋮ | ⋮ |

FIG.20

INITIAL VALUE

42

| ID | USER NAME | ACCOUNT INFORMATION | | PASSWORD | IP ADDRESS |
|---|---|---|---|---|---|
| | | FAX SETTING | FOLDER TRANSMISSION SETTING | | |
| 001 | A | aa | /PERSONAL_CABINET /WORK | AXXXX | 133.139.23.29 |
| 002 | B | bb | /PERSONAL_CABINET /WORK | BXXXX | 133.139.23.29 |
| 003 | C | ss | /PERSONAL_CABINET /WORK | CXXXX | 133.139.23.141 |
| 004 | D | ss | /PERSONAL_CABINET /WORK | DXXXX | 133.139.23.141 |
| 005 | E | ee | /PERSONAL_CABINET /WORK | EXXXX | 133.139.158.79 |
| 006 | F | ff | /PERSONAL_CABINET /WORK | FXXXX | 133.139.158.79 |
| 007 | G | ss | /PERSONAL_CABINET /WORK | GXXXX | 133.139.138.169 |
| 008 | H | ss | /PERSONAL_CABINET /WORK | HXXXX | 133.139.138.169 |
| ⋮ | ⋮ | ⋮ | ⋮ | ⋮ | ⋮ |

INITIAL VALUE

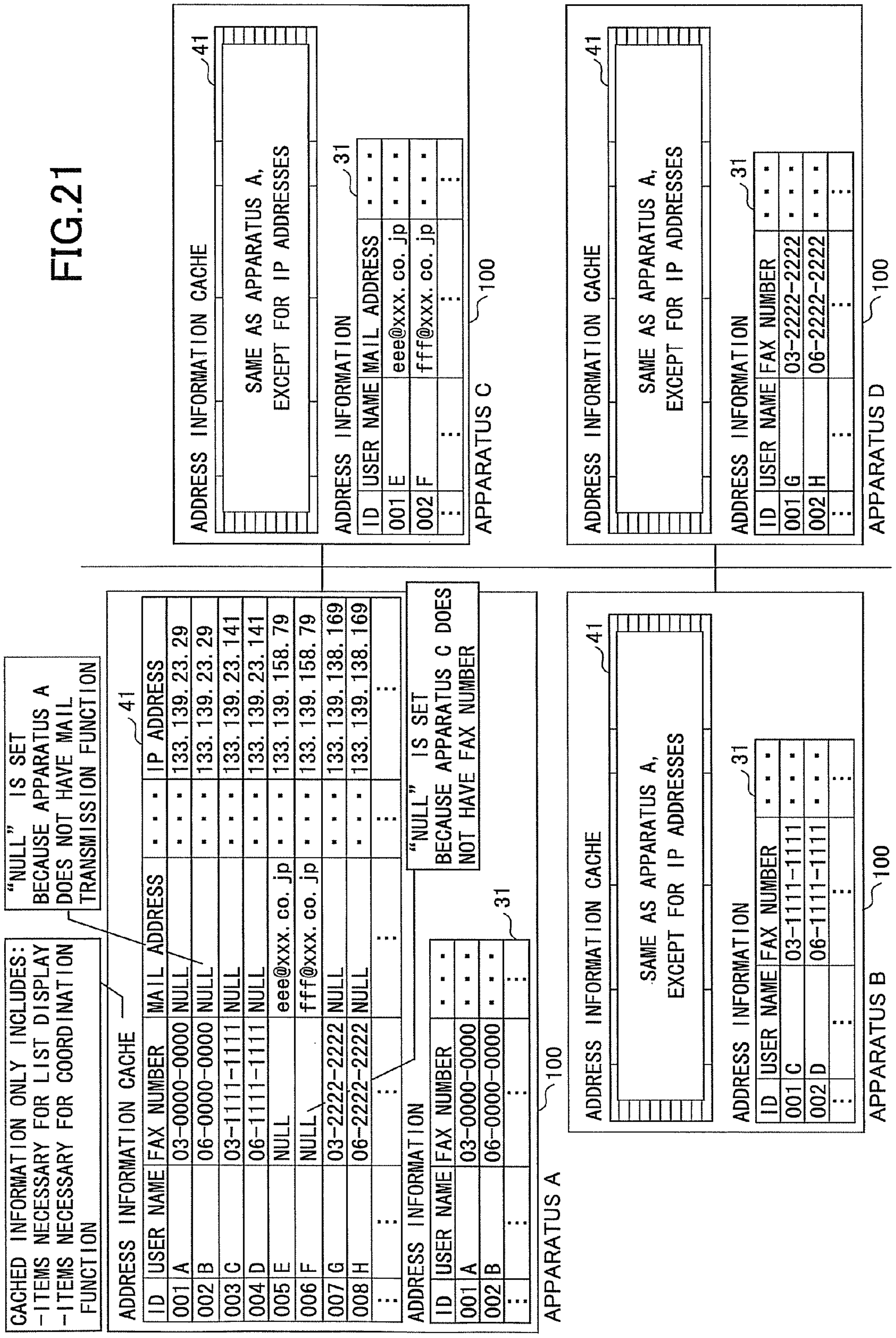

FIG.21

APPARATUS A

CACHED INFORMATION ONLY INCLUDES:
- ITEMS NECESSARY FOR LIST DISPLAY
- ITEMS NECESSARY FOR COORDINATION FUNCTION

ADDRESS INFORMATION CACHE — 41

| ID | USER NAME | FAX NUMBER | MAIL ADDRESS | ... | IP ADDRESS |
|---|---|---|---|---|---|
| 001 | A | 03-0000-0000 | NULL | ... | 133.139.23.29 |
| 002 | B | 06-0000-0000 | NULL | ... | 133.139.23.29 |
| 003 | C | 03-1111-1111 | NULL | ... | 133.139.23.141 |
| 004 | D | 06-1111-1111 | NULL | ... | 133.139.23.141 |
| 005 | E | NULL | eee@xxx.co.jp | ... | 133.139.158.79 |
| 006 | F | NULL | fff@xxx.co.jp | ... | 133.139.158.79 |
| 007 | G | 03-2222-2222 | NULL | ... | 133.139.138.169 |
| 008 | H | 06-2222-2222 | NULL | ... | 133.139.138.169 |
| ... | ... | ... | ... | ... | ... |

"NULL" IS SET BECAUSE APPARATUS A DOES NOT HAVE MAIL TRANSMISSION FUNCTION

"NULL" IS SET BECAUSE APPARATUS C DOES NOT HAVE FAX NUMBER

ADDRESS INFORMATION — 31

| ID | USER NAME | FAX NUMBER | ... |
|---|---|---|---|
| 001 | A | 03-0000-0000 | ... |
| 002 | B | 06-0000-0000 | ... |
| ... | ... | ... | ... |

— 100

---

APPARATUS B

ADDRESS INFORMATION CACHE — 41
SAME AS APPARATUS A, EXCEPT FOR IP ADDRESSES

ADDRESS INFORMATION — 31

| ID | USER NAME | FAX NUMBER | ... |
|---|---|---|---|
| 001 | C | 03-1111-1111 | ... |
| 002 | D | 06-1111-1111 | ... |
| ... | ... | ... | ... |

— 100

---

APPARATUS C

ADDRESS INFORMATION CACHE — 41
SAME AS APPARATUS A, EXCEPT FOR IP ADDRESSES

ADDRESS INFORMATION — 31

| ID | USER NAME | MAIL ADDRESS | ... |
|---|---|---|---|
| 001 | E | eee@xxx.co.jp | ... |
| 002 | F | fff@xxx.co.jp | ... |
| ... | ... | ... | ... |

— 100

---

APPARATUS D

ADDRESS INFORMATION CACHE — 41
SAME AS APPARATUS A, EXCEPT FOR IP ADDRESSES

ADDRESS INFORMATION — 31

| ID | USER NAME | FAX NUMBER | ... |
|---|---|---|---|
| 001 | G | 03-2222-2222 | ... |
| 002 | H | 06-2222-2222 | ... |
| ... | ... | ... | ... |

— 100

| USER NAME | FAX NUMBER | MAIL ADDRESS |
| --- | --- | --- |
| A | 03-0000-0000 | NULL |
| B | 06-0000-0000 | NULL |
| C | 03-1111-1111 | NULL |
| D | 06-1111-1111 | NULL |
| E | NULL | eee@xxx.co.jp |
| F | NULL | fff@xxx.co.jp |
| G | 03-2222-2222 | NULL |
| H | 06-2222-2222 | NULL |

IMAGE FORMING APPARATUS AND METHOD FOR GENERATING USER INFORMATION

BACKGROUND OF THE INVENTION

1. Field of the Invention

The disclosures herein generally relate to apparatuses connected through a network, and particularly relate to an image forming apparatus, an information processing method, and a system that can integrate information stored in the apparatuses.

2. Description of the Related Art

An image forming apparatus such as a copier, a printer, a scanner, a facsimile machine, or an MFP (i.e., multifunction peripheral) having multi-functionality may have address information and account information. The address information may include mail addresses and FAX numbers, for example. The account information includes user IDs and passwords used for logging into the apparatus, and also includes a list of function settings that are used when a logged-in user uses a certain function (e.g., copy function).

Since the address information and account information are stored in the image forming apparatus in advance, a user does not need to enter a FAX number of the recipient each time the user sends image data by use of a FAX function, for example, thereby allowing the user to skip some operation.

The provision of address information and account information in an image forming apparatus improves user convenience. When plural image forming apparatuses are installed in an office, there may be a need to store the same address information and account information in these image forming apparatuses. Maintenance work to manage the address information and account information stored in these image forming apparatuses may increase work load on users. In consideration of this, an LDAP (i.e., Lightweight Directory Access Protocol) server may be installed to allow the address information and account information to be utilized in an integrated manner by use of a key such as a user name.

However, the provision of such a server results in a cost increase. There are some studies made for the purpose of managing address information and account information without using a server (e.g., see Patent Document 1 (Japanese Patent Application Publication No. 2003-251897) and Patent Document 2 (Japanese Patent No. 4211760)).

Patent Document 1 discloses an image forming apparatus that updates user-specific address information of an information processing apparatus stored in a memory device each time access is made based on the same user information. Patent Document 2 discloses an image forming apparatus that stores user information in a user information storage unit when user authentication is successfully performed with respect to a user requesting to use the image forming apparatus.

Image forming apparatuses disclosed in Patent Document 1 and Patent Document 2 are not designed to control and manage, in an integrated manner, address information and account information stored in plural image forming apparatuses.

Accordingly, it may be desirable to provide an image forming apparatus, an information generating method, and a system that can control and manage address information and account information stored in plural image forming apparatuses in an integrated manner.

SUMMARY OF THE INVENTION

It is a general object of at least one embodiment of the present invention to provide an image forming apparatus that substantially obviates one or more problems caused by the limitations and disadvantages of the related art.

In one embodiment, an image forming apparatus configured to be connected to one or more apparatuses through a network includes a user information storing unit to store local-apparatus user information about one or more users of the image forming apparatus, an apparatus information storing unit to store information indicative of the one or more apparatuses, a user information acquiring unit to acquire remote-apparatus user information from the one or more apparatuses indicated by the information stored in the apparatus information storing unit, and a user information integration unit to merge the local-apparatus user information and the remote-apparatus user information to generate display-purpose user information to be displayed on a screen, and to transmit the local-apparatus user information to the one or more apparatuses with a request to generate display-purpose user information.

In one embodiment, a method of generating information is provided for an apparatus which is connected to one or more apparatuses through a network. The apparatus includes a user information storing unit to store local-apparatus user information about one or more users of the apparatus, and an apparatus information storing unit to store information indicative of the one or more apparatuses. The method includes acquiring, by use of a user information acquiring unit, remote-apparatus user information from the one or more apparatuses indicated by the information stored in the apparatus information storing unit, and merging, by use of a user information integration unit, the local-apparatus user information and the remote-apparatus user information to generate display-purpose user information to be displayed on a screen, and transmitting the local-apparatus user information to the one or more apparatuses with a request to generate display-purpose user information.

In one embodiment, a system is provided in which plural image forming apparatuses are connected through a network. A first one of the image forming apparatuses includes a user information storing unit to store local-apparatus user information about one or more users of the first one of the image forming apparatuses, an apparatus information storing unit to store information indicative of a second one of the image forming apparatuses, a user information acquiring unit to acquire remote-apparatus user information stored in the second one of the image forming apparatuses from the second one of the image forming apparatuses indicated by the information stored in the apparatus information storing unit, and a user information integration unit to merge the local-apparatus user information and the remote-apparatus user information to generate display-purpose user information to be displayed on a screen, and to transmit the local-apparatus user information to the second one of the image forming apparatuses with a request to generate display-purpose user information.

According to at least one embodiment, an image forming apparatus is provided that can control and manage address information and account information stored in plural image forming apparatuses in an integrated manner.

BRIEF DESCRIPTION OF THE DRAWINGS

Other objects and further features of embodiments will be apparent from the following detailed description when read in conjunction with the accompanying drawings, in which:

FIG. 11 is a drawing illustrating an example of a coordinated-apparatus management table stored by an apparatus coordination control unit in an HDD or the like;

FIGS. 13A and 13B are drawings illustrating an example of integration-purpose address information generated from address information;

FIG. 14 is a drawing illustrating an example of integration-purpose account information generated from account information;

FIG. 16 is a drawing illustrating an example of list-purpose address information which is obtained by setting "NULL" in the integration-purpose address information;

FIG. 18 is a drawing illustrating an example of integrating the account information when the apparatus A receives the account information of the apparatus B;

FIG. 20 is a drawing illustrating an example of list-purpose account information which is obtained by setting initial values in the integration-purpose account information;

FIG. 21 is a drawing illustrating an example of the list-purpose address information provided in the apparatuses A through D;

DESCRIPTION OF THE PREFERRED EMBODIMENTS

In the following, embodiments for carrying out the present invention will be described by referring to the accompanying drawings.

[Outline of Apparatus]

Figure 1:
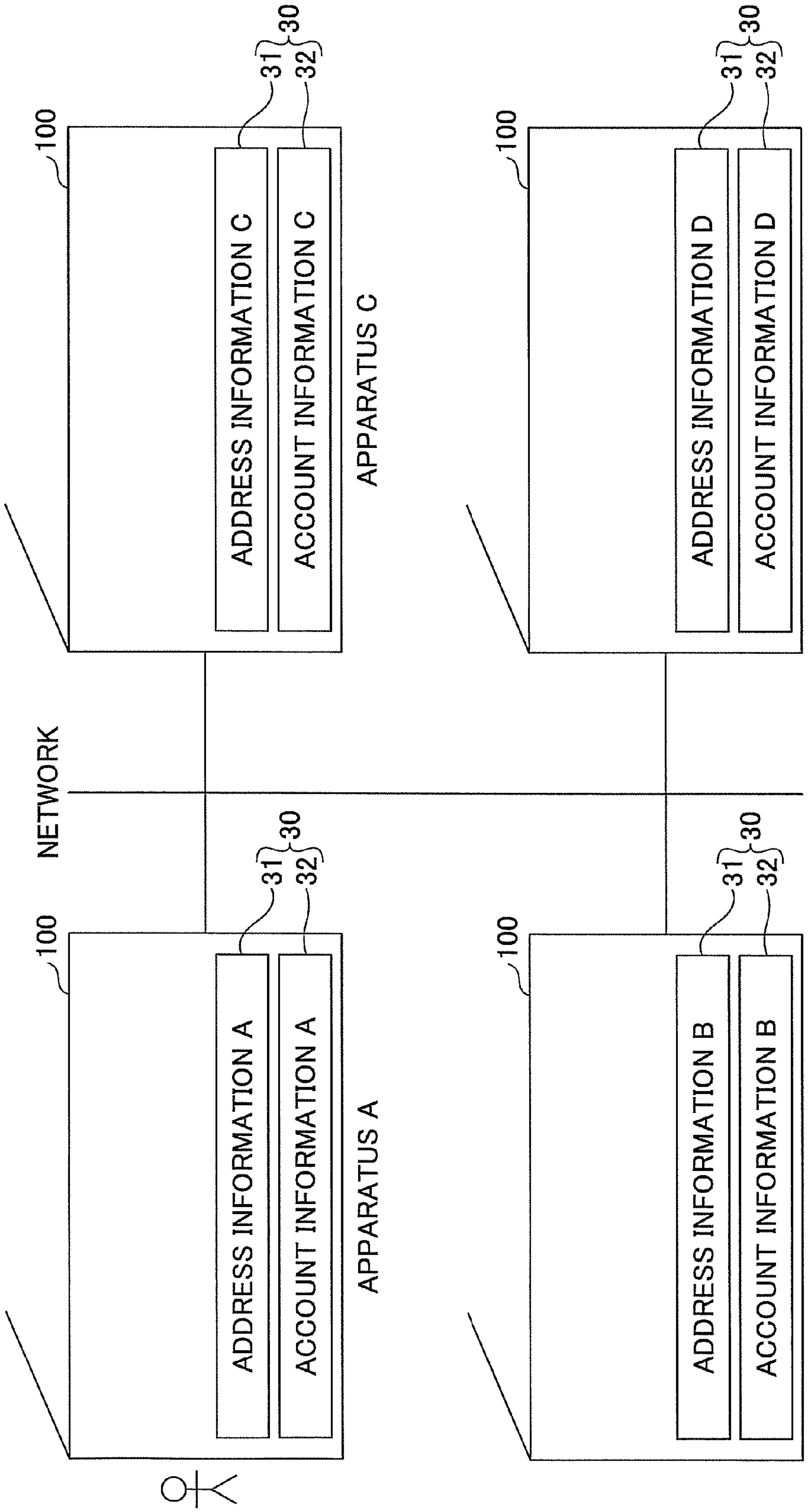
FIG. 1 is a drawing illustrating an outline of apparatuses according to an embodiment.

FIG. 1 is a drawing illustrating the schematic configuration of a system according to a present embodiment. In a system 200, four apparatuses (which may be referred to as apparatuses A through D when they need to be discriminated from each other) are connected to each other through a network. The network may be a LAN, a VLAN (i.e., Virtual LAN), a WAN, or the Internet. It does not matter whether the network is wireless or wired.

Each of the apparatuses A through D stores therein address information 31 (which may be referred to as address information A through D for discrimination purposes) and account information 32 (which may be referred to as account information A through D for discrimination purposes). The address information 31 and the account information 32 (which may collectively be referred to as user information 30) will be described later. A user may wish to use the address information B or account information B stored in the apparatus B by operating the apparatus A, for example. The user's FAX number and/or mail address may be stored as the address information B, and the user's application settings may be stored as the account information B.

In order for the user using the apparatus A to utilize the address information B or account information B stored in the apparatus B, each of the image forming apparatuses A through D of the present embodiment holds the address information A through D and the account information A through D as cached data.

Figure 2:
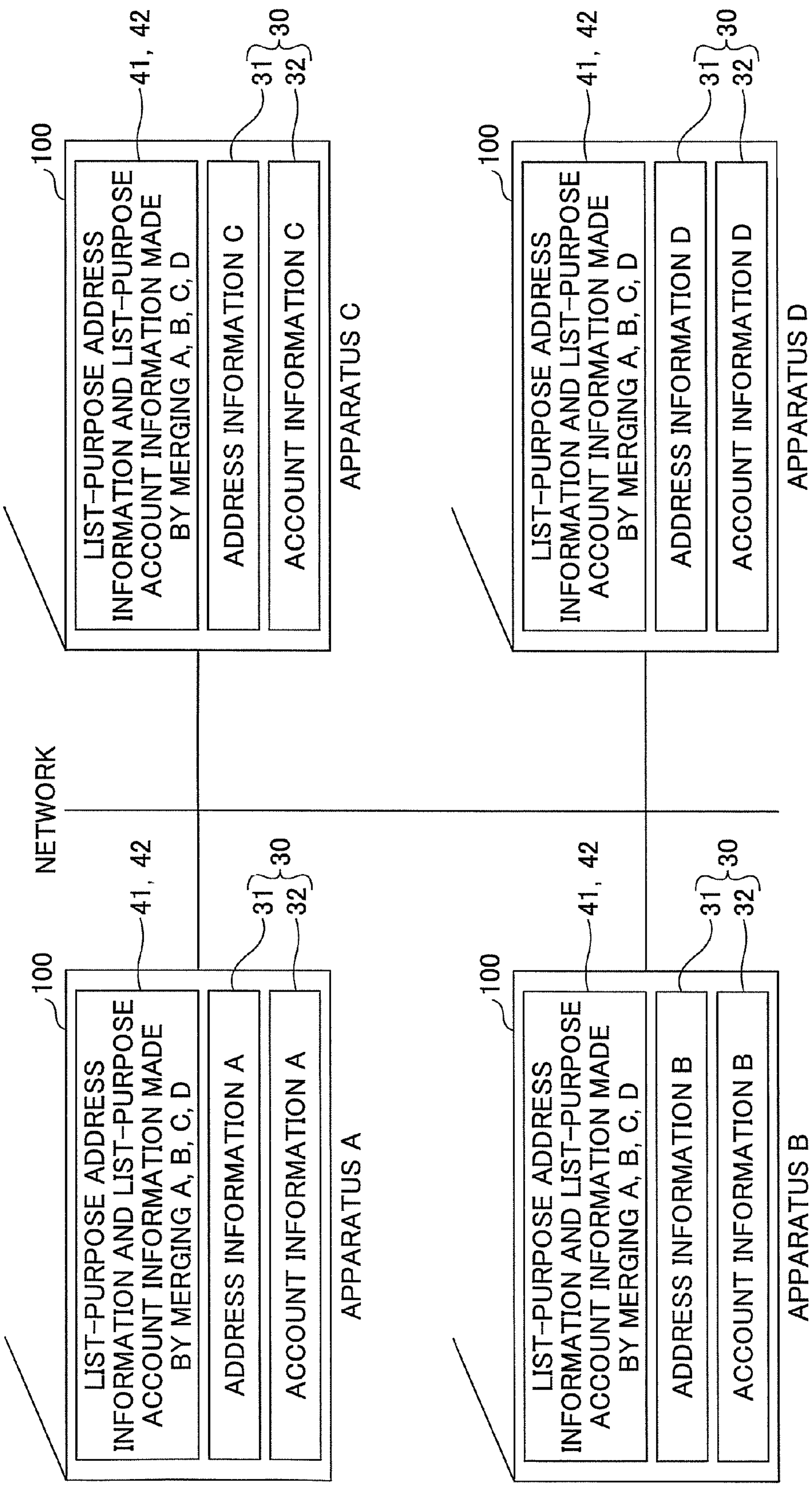
FIG. 2 is a drawing illustrating an example of apparatuses A through D in which address information A through D and account information A through D are stored as cached data.

FIG. 2 is a drawing illustrating an example of the apparatuses A through D in which the address information A through D and the account information A through D are stored as cached data. As illustrated in FIG. 2, each of the apparatuses A through D has "list-purpose address information and list-purpose account information obtained by merging A, B, C, D" stored therein. Here, "list-purpose address information and list-purpose account information obtained by merging A, B, C, D" are equivalent to the address information A through D and the account information A through D that are merged.

Each of the apparatuses A through D merges the address information A through D and account information A through D stored in the apparatuses A through D, so that the address information A through D and the account information A through D are displayed in a list without being discriminated from each other. Accordingly, the user operating the apparatus A can utilize the address information A through D and account information A through D corresponding to the apparatuses A through D as a single address information record and a single account information record, respectively.

[Apparatus Coordination]

With the above-described arrangement, the apparatuses A through D of the present embodiment allow the address information A through D and account information A through D stored in the apparatuses A through D to be used by a user as a single address information record and a single account information record, respectively. Without installing a directory server, the above-noted arrangement allows the address information A through D and the account information A through D to be utilized in an integrated manner.

There are several types of usages of the apparatuses A through D that improve user convenience by utilizing the address information A through D and the account information A through D in an integrated manner. One of such usages is apparatus coordination by which the apparatus A utilizes the functions of the apparatuses B through D. Apparatus coordination between the apparatuses A through D will be described in the following.

Figure 3:
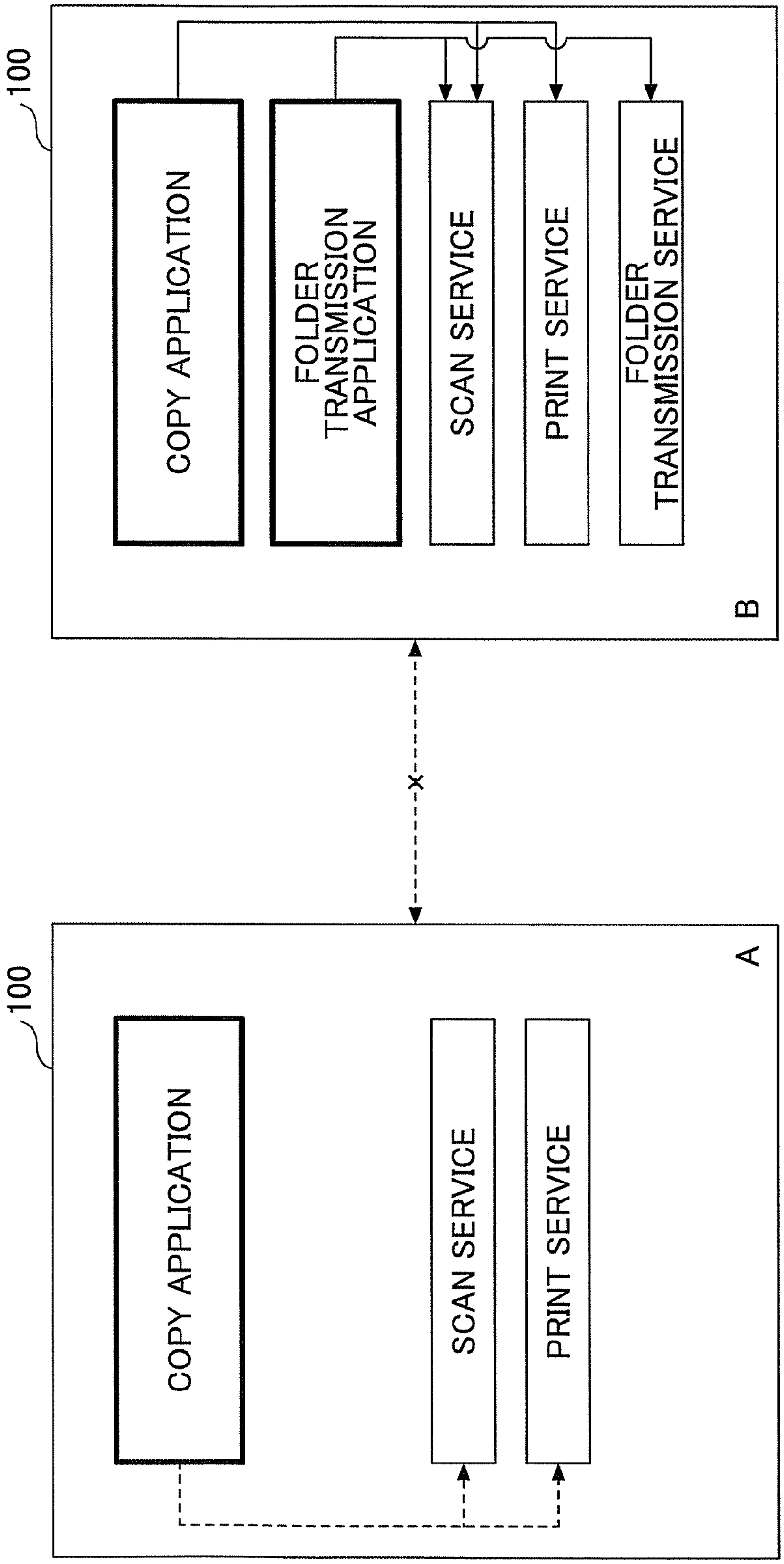
FIG. 3 is a drawing for explaining apparatus coordination.

FIG. 3 is a drawing for explaining apparatus coordination. Each apparatus 100 generally operates on an application-specific basis. An application of the apparatus 100 is software that performs a series of processes in respect of a combination of one of the input units and one of the output units provided in the apparatus 100. An application may refer to substantially the same thing as a function of the apparatus 100.

Various types of applications may be available. In an example illustrated in FIG. 3, the apparatus A has a copy application, and the apparatus B has a copy application and a folder transmission application. In the case of the copy application, an input unit is a scanner engine that scans a document, and an output unit is a plotter engine that prints to a paper medium. In the case of the folder transmission application, an input unit is a scanner engine that scans a document, and an output unit is a memory device (e.g., a folder of a personal computer) that stores the image data. In this manner, the apparatus can provide a user with various applications by using various combinations of an input unit and an output unit.

The applications of the standalone apparatuses A and B as illustrated in FIG. 3 perform their tasks by combining services that are necessary to achieve the object of the applications. In the apparatus A, a scan service and a print service that are necessary for the copy application are registered. In the apparatus B, a transmission service that is necessary for the folder transmission application is registered in addition to the above-noted services.

The applications and services in the apparatuses A and B are designed based on the same design concepts even though there may be some differences between different versions. Accordingly, each application can use any service by calling the service by use of the API (i.e., Application Program Interface). The copy application of the apparatuses A and B illustrated in FIG. 3 uses the local scan service to scan a document, and uses a print service to print the generated image data to a print sheet. Further, the folder transmission application of the apparatus B uses the local scan service to scan a document, and uses the folder transmission service to transmit the generated image data to a folder. In the apparatus B, the copy application and the folder transmission application use the same scan service.

Figure 4:
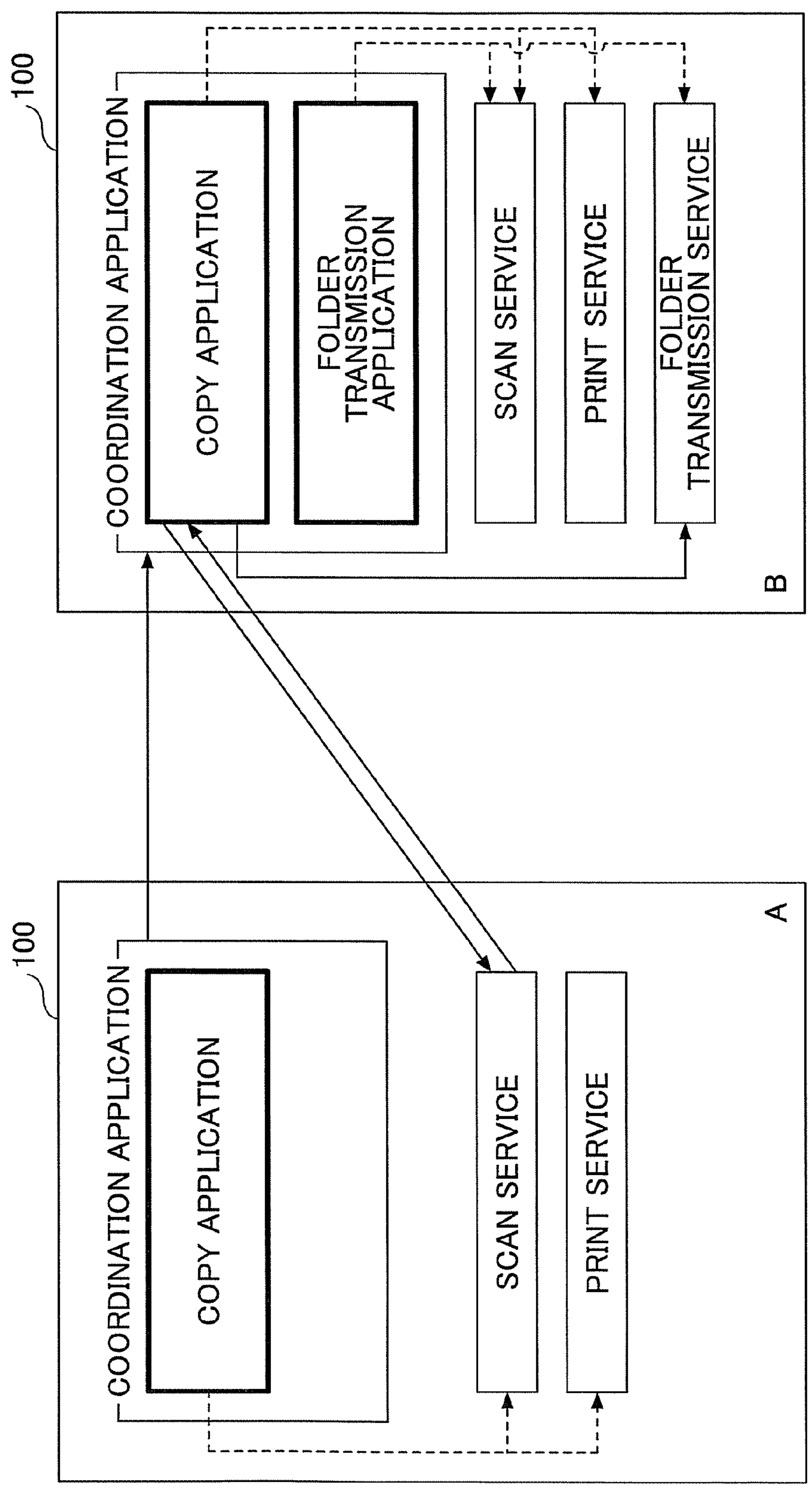
FIG. 4 is a drawing for illustrating the operations of an application and services when using an apparatus coordinate function.

Such relationships in service utilization between the apparatuses are provided by apparatus coordination functions. FIG. 4 is a drawing for illustrating the operations of an application and services when using an apparatus coordinate function. In FIG. 4, the same elements as those of FIG. 3 are referred to by the same numerals, and a description thereof will be omitted. In the apparatus A, a folder transmission application and a folder transmission service are not available. The apparatus A thus uses the folder transmission application and the folder transmission service of the apparatus B.

A user operates the apparatus A to activate a coordination application. In response, the apparatus B's registration screen and selection screen for selecting a function (i.e., application) to be coordinated are displayed at the apparatus A. The coordinate application knows the apparatus B and applications thereof that can be coordinated from the apparatus A. Upon selection of the apparatus B's folder transmission application, the selected folder transmission application uses the apparatus A's scan service to generate image data, and uses the apparatus B's folder transmission service to transmit the image data to a folder.

In this manner, the user only operates the apparatus A to instruct the apparatus B that can be coordinated, thereby performing a job based on coordination between the apparatuses. The following are examples of apparatus coordination:

- image data generated by the apparatus A's scan service being printed by the apparatus B's print service;
- image data generated by the apparatus A's scan service being transmitted by the apparatus B's folder transmission service (wherein transmission includes FAX, email, and transfer to a folder, etc.); and
- image data generated by the apparatus A's scan service being converted into a predetermined format by the apparatus B's scan service.

[Apparatus Configuration]

Figure 5:
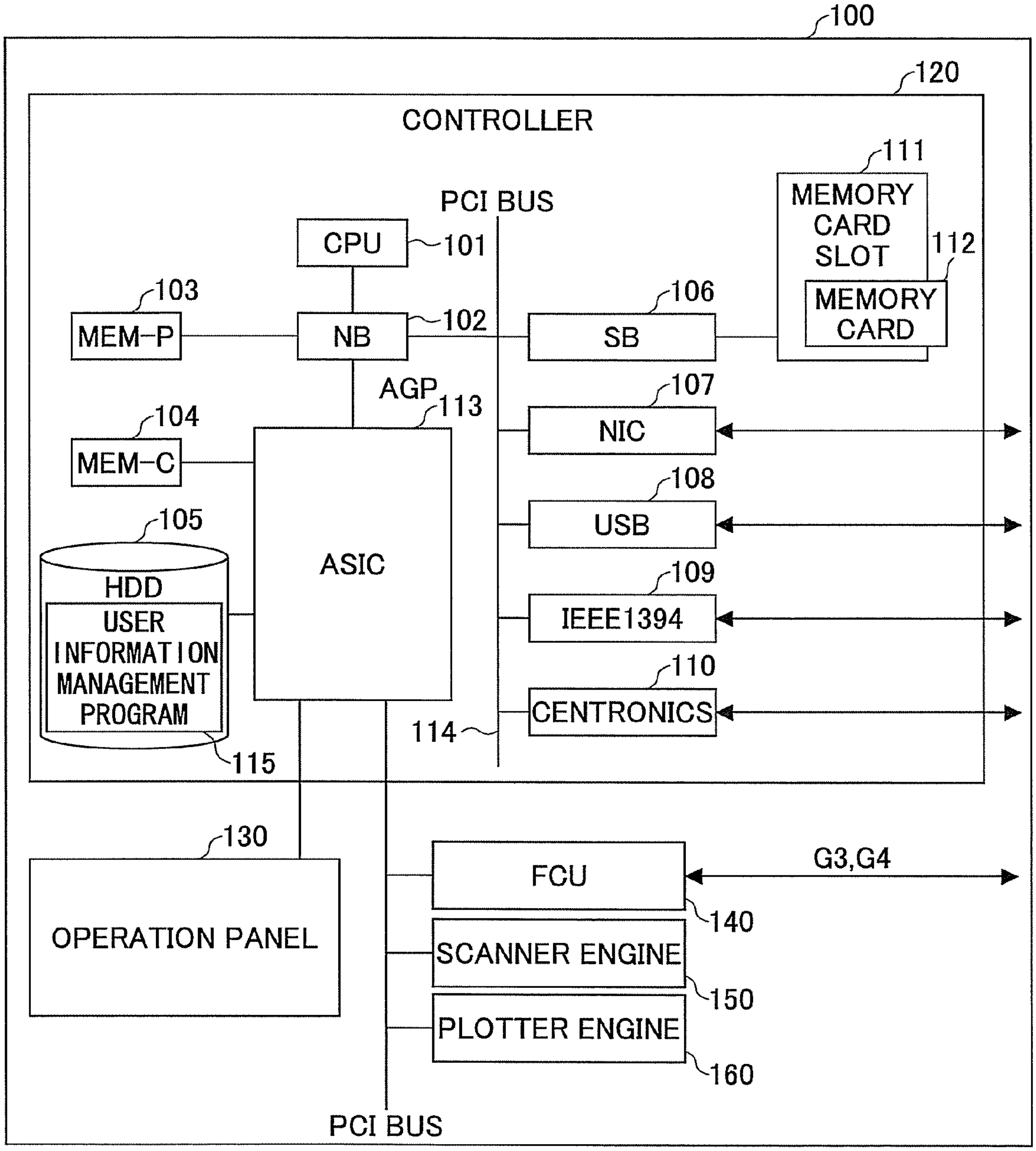
FIG. 5 is a drawing illustrating an example of the hardware configuration of an apparatus.

FIG. 5 is a drawing illustrating an example of the hardware configuration of the apparatus 100. The apparatus 100 is a copier, a printer, a scanner, a FAX machine, an MFP (i.e., multifunction peripheral) having two or more functions of these apparatuses, or an image forming apparatus. The apparatuses A through D may be the same product, or may be different products. The apparatuses A through D are provided with coordinate functions.

The apparatus 100 includes a controller 120, an operation panel 130, an FCU (facsimile control unit) 140, a scanner engine 150, and a plotter engine 160.

The controller 120 includes a CPU 101, an ASIC 113, an NB (north bridge) 102, an SB (south bridge) 106, an MEM-P (system memory) 103, an MEM-C (local memory) 104, an HDD (hard-disk drive) 105, a memory card slot 111, an NIC (network interface controller) 107, a USB device 108, an IEEE 1394 device 109, and a Centronics device 110.

The CPU 101 is an IC for performing various types of information processing. The CPU 101 executes application programs and service providing programs in parallel on a process-by-process basis based on an OS such as UNIX (registered trademark). The ASIC 113 is an IC for image processing. The NB 102 is the bridge that connects between the CPU 101 and the ASIC 113. The SB 106 is the bridge that connects between the NB 102 and peripheral devices. The ASIC 113 and the NB 102 are connected to each other via an AGP (Accelerated Graphics Port).

The MEM-P 103 is a memory connected to the NB 102. The MEM-C 104 is a memory connected to the ASIC 113. The HDD 105 is a storage connected to the ASIC 113. The HDD 105 is used to store image data, document data, programs, font data, form data, etc. In FIG. 5, only a user information management program 115 is illustrated within the HDD 105.

The memory card slot 111 is connected to the SB 106, and receives a memory card 112 set therein (i.e., inserted thereinto). The memory card 112 may be a flash memory such as a USB memory. The memory card 112 may be used to distribute the user information management program 115. Alternatively, the user information management program 115 may be downloaded from a server to the apparatus 100.

The NIC 107 is a controller that performs data communication via a network or the like by use of MAC addresses or the like. The USB device 108 serves to provide a serial port conforming to the USB specification. The IEEE 1394 device 109 serves to provide a serial port conforming to the IEEE1394 specification. The Centronics device 110 serves to provide a parallel port conforming to the Centronics specification. The NIC 107, the USB device 108, the IEEE1394 device 109, and the Centronics device 110 are connected to the NB 102 and the SB 106 via a PCI (Peripheral Component Interconnect) bus 114.

The operation panel 130 serves as the hardware unit (operation unit) by which a user enters an input into the apparatus 100, and also serves as the hardware unit (display unit) through which the apparatus 100 presents visual information to an operator. The operation panel 130 is connected to the ASIC 113. The FCU 140, the scanner engine 150, and the plotter engine 160 are connected to the ASIC 113 via a PCI (Peripheral Component Interconnect) bus.

The scanner engine 150 optically scans a document placed on a contact glass, and applies image processing to scan data obtained through A/D conversion, thereby generating digital data having predetermined resolution (which will hereinafter be referred to as image data).

The plotter engine 160 includes photoconductive drums arranged in tandem. The plotter engine 160 modulates laser beams based on the above-noted image data or PDL (page description language) data received from a user PC (personal computer) to scan the photoconductive drums with the laser beams, thereby creating latent images. The latent images are developed by attaching toner. These images for one page are transferred to a print sheet by heat and pressure.

The FCU 140 may be connected to a network through the NIC 107 to transmit and receive image data in accordance with a communication protocol conforming to the T.37 or T.38 standard. The FCU 140 may be connected to a public communication network through the NIC 107 to transmit and receive image data in accordance with a communication protocol conforming to the G3 or G4 standard. The apparatus 100 may receive image data while the power of the apparatus 100 is off. In such a case, the plotter engine 160 may be activated to print the image data to a print sheet.

Figure 6:
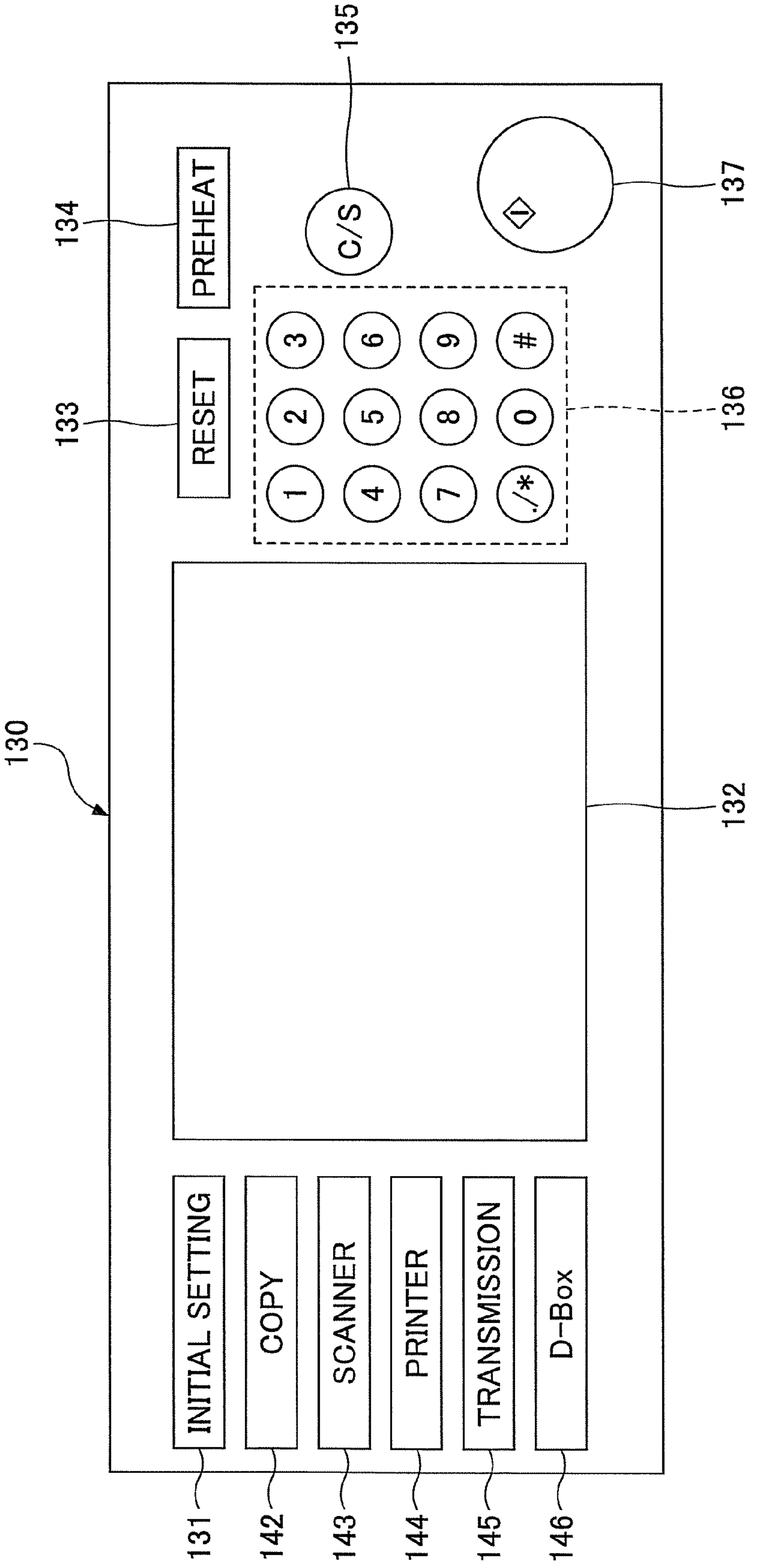
FIG. 6 is a drawing illustrating an example of an operation panel.

FIG. 6 is a drawing illustrating an example of the operation panel 130. The operation panel 130 includes fixed hard keys such as an initial setting key 131, a copy key 142, a scanner key 143, a printer key 144, a transmission key 145, a D-Box key 146, a key pad 136, a clear/stop key 135, and a start key 137. The operation panel 130 further includes a liquid crystal display unit 132.

The liquid crystal display unit 132 includes a touch panel, which provides buttons for various types of screens (i.e., user interfaces). The mechanism to display information is not limited to liquid crystal display, and may use organic electro luminescence.

The initial setting key 131 is used by a user to select initial screen display settings and initial function settings with respect to each application, to activate/deactivate an authentication function, and to make other various settings. The copy key 142, the scanner key 143, the printer key 144, the transmission key 145, and the D-Box key 146 are used to switch between applications.

The key pad 136 are used by a user to enter numbers to indicate the number of printouts, a FAX number, a mail address, or the like. The clear/stop key 135 is used to cancel an entered number and to suspend a scan or print operation. The start key 137 is used to start a copy operation, a FAX transmission, etc.

Figure 7:
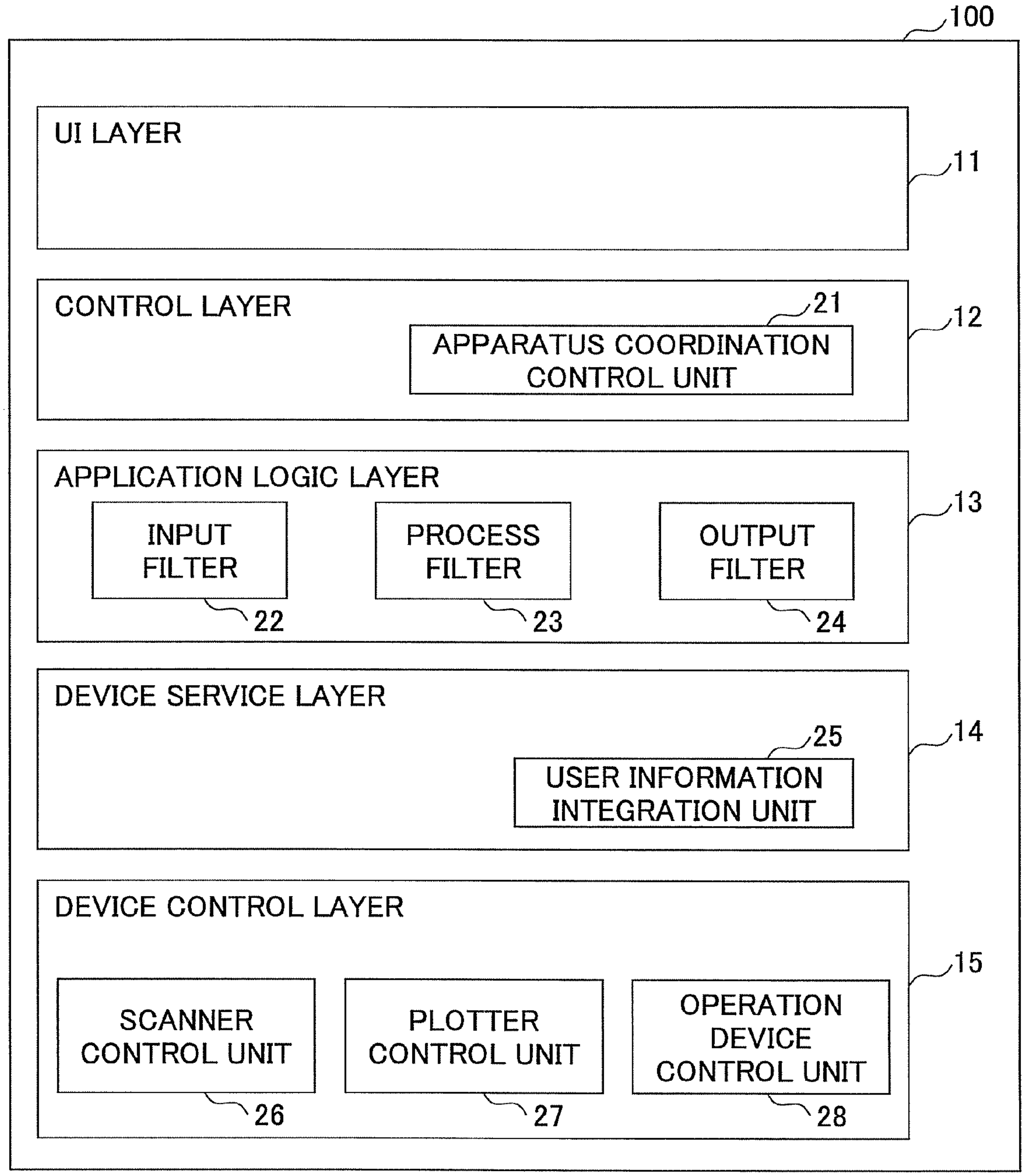
FIG. 7 is a drawing illustrating an example of the software configuration of an apparatus.

FIG. 7 is a drawing illustrating an example of the software configuration of the apparatus 100. The software provided in the apparatus 100 includes a UI layer 11, a control layer 12, an application logic layer 13, a device service layer 14, and a device control layer 15. The UI layer 11 serves as the top layer. In the illustrated arrangement of these layers from top to bottom, a given layer calls a next lower layer as a general principle.

The UI layer 11 is the software that receives an indication of selection of an application (i.e., function), information indicative of job conditions (e.g., print conditions, scan conditions, transmission conditions, etc.), and a request for job execution. The job-execution request received by the UI layer 11 is transferred to the control layer 12.

The control layer 12 controls connections between various components in the application logic layer 13 in order to perform the requested job. Specifically, the control layer 12 connects filters in the application logic layer 13 in accordance with the requested job, and controls processing performed by the connected filters.

In the application logic layer 13, a set of parts (e.g., filters and components) are provided to implement functions provided by the apparatus 100. Namely, the filters and components in the application logic layer 13 are combined with each other to implement functions. There may be no definitive difference between the filter and the component.

The filter is a software component. The reason why this component is referred to as a "filter" is because the apparatus 100 of the present embodiment employs a software architecture called a "pipe-&-filter architecture". This software architecture performs a job by combining filters serving as job processing means and pipes serving to connect between the filters. The filters include an input filter 22, a process filter 23, and an output filter 24.

The input filter 22 serves to control the scanner engine 150. The input filter 22 controls the scanning of image data, and outputs the scanned image data to a pipe. Any filter that processes data entered into the apparatus may be classified as the input filter 22.

The process filter 23 applies predetermined processing (e.g., format conversion, combine, enlarge, reduce, etc.) to the image data obtained from the input filter 22 via the pipe. The output filter 24 serves to control the plotter engine 160, for example, thereby printing image data on a print sheet. The output filter 24 may not only be a filter for printing to a print sheet, but may also include a filter for storing image data in the HDD 105, a filter for attaching image data to email for transmission, a filter for performing FAX transmission, and a filter for transmitting image data to a folder in a user PC, for example.

The device service layer 14 includes pipes that are used by the filters of the application logic layer 13. Such pipes include a pipe for transmitting image data from the input filter 22 to the process filter 23 and a pipe for transmitting image data from the process filter 23 to the output filter 24. The device service layer 14 also controls and manages the address information A through D, the account information A through D, and accumulated image data.

In the device control layer 15, various device drivers are implemented. The device control layer 15 includes a scanner control unit 26, a plotter control unit 27, an operation device control unit 28. These units are programs for controlling the operations of the scanner engine 150 and the plotter engine 160, for example, in accordance with job conditions.

In the present embodiment, an apparatus coordination control unit 21 is included in the control layer 12, and a user information integration unit 25 is included in the device service layer 14. These arrangements are examples only. As long as the apparatus coordination control unit 21 and the user information integration unit 25 are provided in the apparatus, it does not matter where these units are. The apparatus coordination control unit 21 and the user information integration unit 25 are implemented by executing the user information management program 115 by use of the CPU 101.

The apparatus coordination control unit 21 is software provided in an apparatus having a coordination application. The apparatus coordination control unit 21 controls coordination of functions and exchange of user information 30. The user information integration unit 25 merges the address information A through D and the account information A through D. This will later be described in detail.

[User Information]

Figure 8:
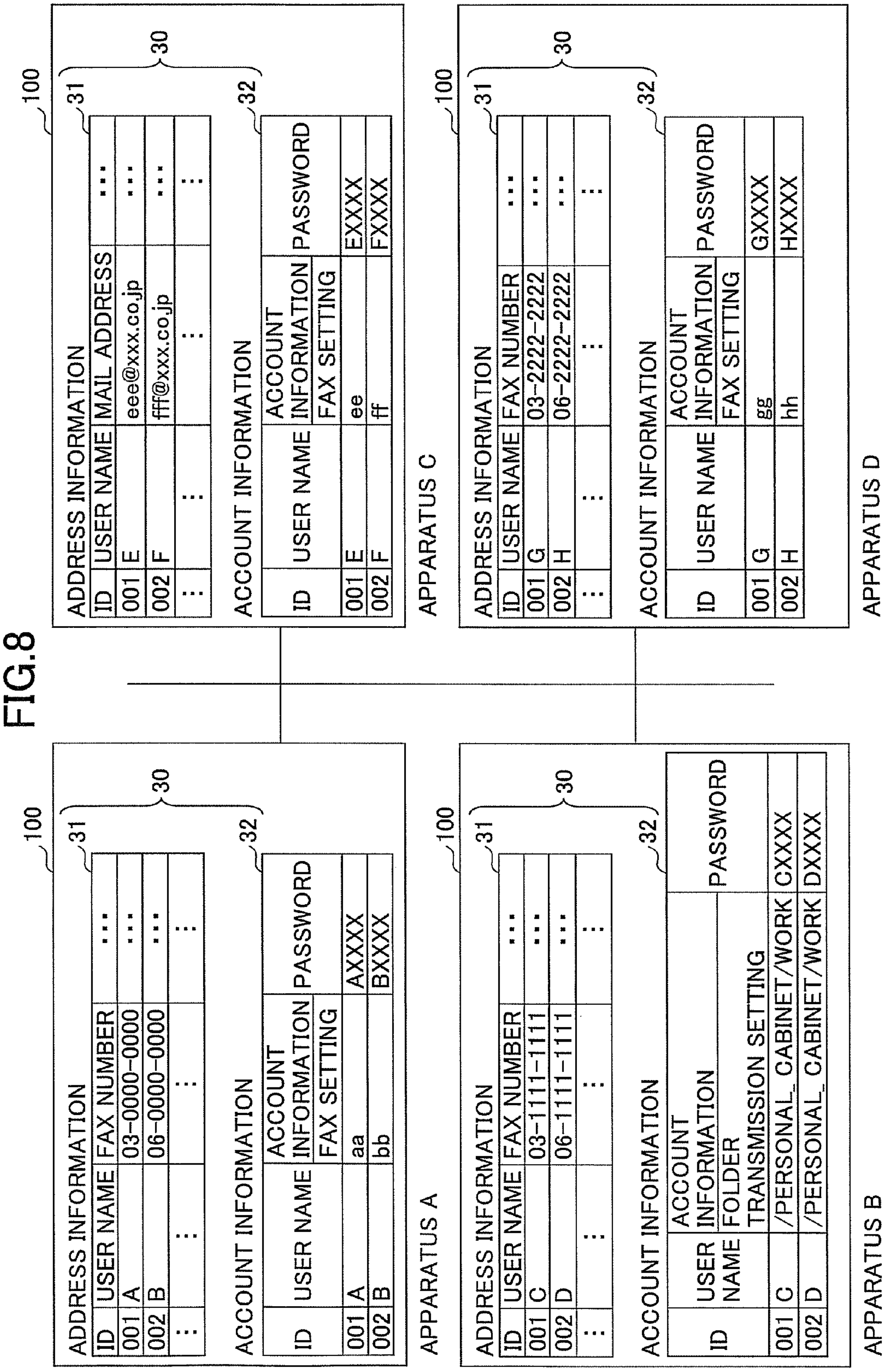
FIG. 8 is a drawing illustrating an example of the user information of each apparatus.

FIG. 8 is a drawing illustrating an example of the user information 30 of each apparatus. Among the user information 30, the address information A through D includes information indicative of destinations to which image data is sent at the time of FAX transmission and mail transmission. The account information A through D includes user IDs used for logging into the apparatus and settings that are settable to a relevant function. In FIG. 8, at least one of the FAX number and the mail address is registered in the address information A through D. This is only an example, and the address information may include IP addresses and folder information. The FAX number and the mail address may be referred to as attributes.

In FIG. 8, either "FAX setting" or "folder transmission setting" is registered as the account information A through D. The FAX setting and the folder transmission setting may be referred to as attributes. The account information A through D includes an essential attribute and a nonessential attribute that is provided or not provided depending on the functions provided in the apparatus.

The address information A stored in the apparatus A includes a user name and a FAX number associated with an ID that is unique only within the apparatus A. The account information A stored in the apparatus A includes a user name and a FAX setting associated with an ID that is unique only within the apparatus A.

Address information 31 and account information 32 do not have to be provided as a pair. The apparatus 100 may have only the address information 31 in one case, and may have only the account information 32 in another case. When the address information 31 and the account information 32 are provided as a pair, the same ID is assigned to the same user name in the apparatus 100.

By the same token, the address information B or D stored in the respective apparatus B or D includes a user name and a FAX number associated with an ID that is unique only within the respective apparatus B or D. The account information B or D stored in the respective apparatus B or D includes a user name and a FAX setting associated with an ID that is unique only within the respective apparatus B or D.

The address information C stored in the apparatus C includes a user name and a mail address associated with an ID that is unique only within the apparatus C. The account information C stored in the apparatus C includes a user name and a folder transmission setting associated with an ID that is unique only within the apparatus C.

In this manner, each apparatus A through D controls and manages the user information 30 independently of the other apparatuses. The user information stored in the apparatuses A through D may be referred to as "original" user information 30. The apparatus 100 of the present embodiment integrates the user information 30 prior to apparatus coordination, thereby making it possible for a user of the apparatus A to utilize the user information 30 stored in the apparatuses B through D.

[Sequence for Coordination Between Apparatuses]

Figure 9:
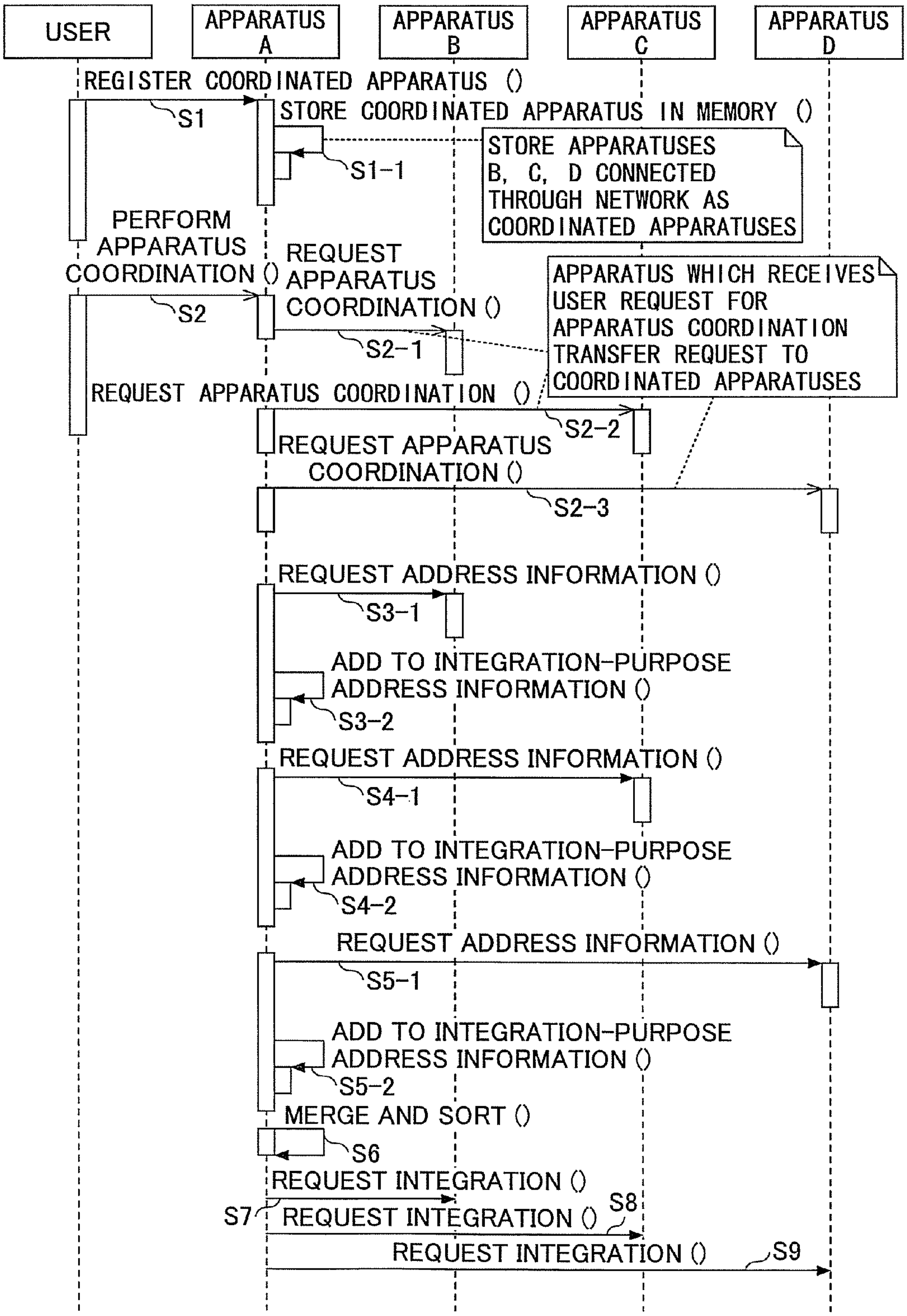
FIG. 9 is a drawing illustrating an example of a sequence of integrating the user information for apparatus coordination.

FIG. 9 is a drawing illustrating an example of a sequence of integrating the user information 30 for apparatus coordination. In the following, a user operates the apparatus A. The sequence remains similar when the user operates one of the other apparatuses B through D.

The user registers one or more apparatuses for function coordination (S1). The user may press the initial setting key 131 or a soft key provided on the liquid crystal display unit 132 to cause a coordinated-apparatus registration screen 201 on the operation panel 130, which is to be used to register apparatuses for function coordination.

Figure 10A:
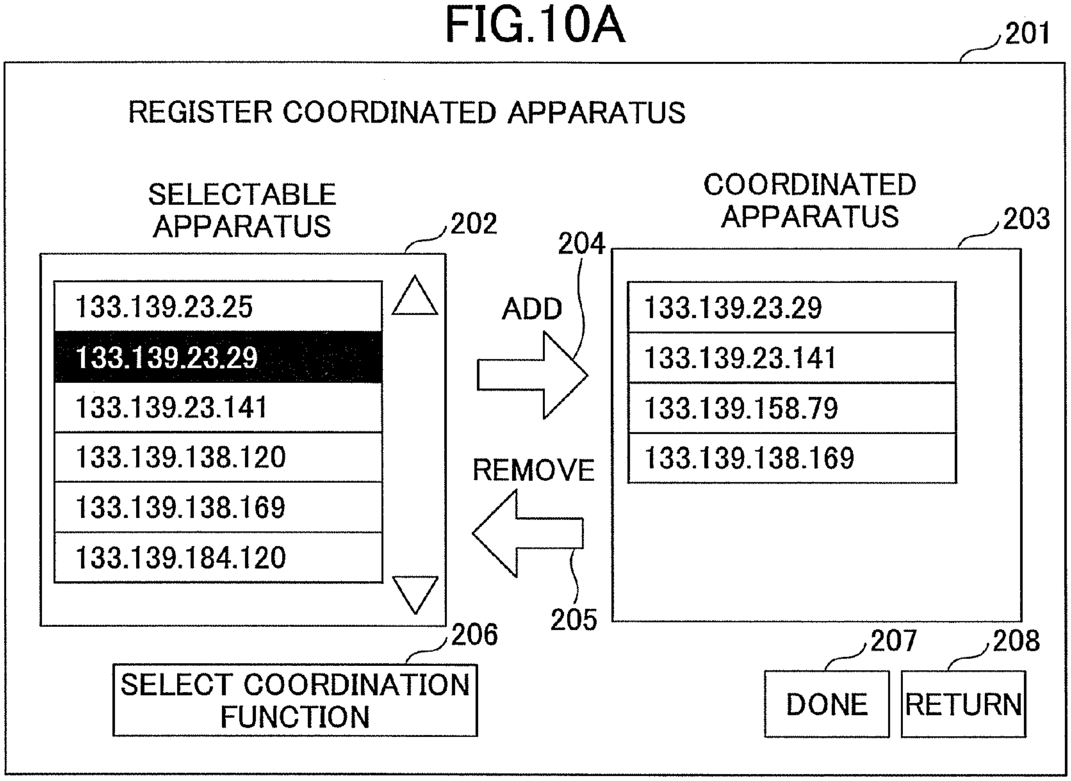
FIGS. 10A and 10B are drawings illustrating an example of a coordinated-apparatus registration screen and an example of a coordinated-function select screen, respectively.

FIG. 10A is a drawing illustrating an example of the coordinated-apparatus registration screen 201. Upon the UI layer 11 receiving a request to display the coordinated-apparatus registration screen 201, the apparatus coordination control unit 21 searches for the apparatuses B through D that are to be subject to function coordination among the apparatuses connected to the network. The IP addresses of the apparatuses B through D that are available for function coordination may be registered in advance in the apparatus A. Alternatively, the apparatus A may make broadcast inquiry to the apparatuses B through D based on their IP addresses to check whether they are available for function coordination, thereby listing up the apparatuses B through D as apparatuses available for functional coordination. Here, the expression "an apparatus available for functional coordination" means that the apparatus of interest has a coordination application.

The coordinated-apparatus registration screen 201 displays a selectable apparatus list 202, a coordinated-apparatus list 203, a coordination function select button 206, an add button 204, a remove button 205, a done button 207, and a return button 208. The selectable apparatus list 202 lists the IP addresses of apparatuses that are available for function coordination. The use of IP addresses is only an example. Apparatus names or product names may be displayed in place of IP addresses or together with IP addresses.

A user touches one of the IP addresses in the selectable apparatus list 202 to highlight the selected apparatus. The user then touches the add button 204 to display the IP address of the highlighted apparatus in the coordinated-apparatus list 203. The user may touch one of the IP addresses in the coordinated-apparatus list 203 to highlight the selected apparatus. The user may then press the remove button 205 to remove the IP address of the selected apparatus from the coordinated-apparatus list 203. Through these operations, the user displays the IP addresses of the apparatuses that are subject to functional coordination. In FIG. 10A, four IP addresses are displayed in the coordinated-apparatus list 203. These operations correspond to the registration of coordinated apparatuses (S1) illustrated in FIG. 9. The apparatus coordination control unit 21 stores coordinated apparatuses in memory in response to user operations (S1-1).

The user may press the coordination function select button 206 while the IP address of the selected apparatus is highlighted in the coordinated-apparatus list 203. In response, the apparatus coordination control unit 21 displays a coordinated-function select screen 301.

Figure 10B:
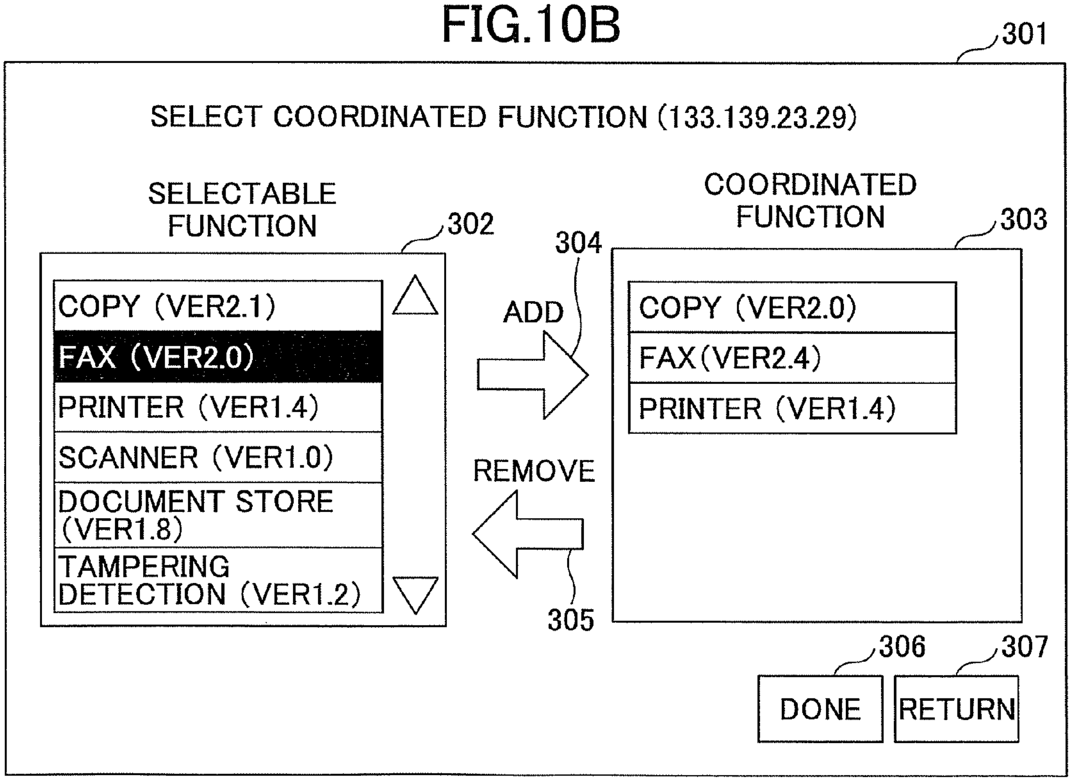

FIG. 10B is a drawing illustrating an example of the coordinated-function select screen 301. The coordinated-function select screen 301 is used to select functions to be coordinated among the functions of the apparatus whose IP address is highlighted in the coordinated-apparatus list 203. Here, the term "function" means an application. The coordinated-function select screen 301 displays a selectable function list 302, a coordinated-function list 303, an add button 304, a remove button 305, a done button 306, and a return button 307. The selectable function list 302 shows a list of the functions of the apparatus whose IP address is highlighted in the coordinated-apparatus list 203. The apparatus coordination control unit 21 of the apparatus A makes inquiry to the apparatus whose IP address is highlighted in the coordinated-apparatus list 203 to lean the functions that the apparatus has, thereby displaying these functions on the selectable function list 302.

In FIG. 10B, the selectable function list 302 shows "copy (ver2.1)", "FAX (ver2.0)", "printer (ver1.4), "scanner (ver1.0)", "document store (ver1.8)", and "tampering detect (ver1.2)". The number shown in the parentheses indicates a version of the relevant application. The apparatus coordination control unit 21 of the apparatus A acquires information indicative of the version number of an application from the coordinated apparatus, so that compatibility is ensured despite differences in version numbers at the time of integrating the user information 30.

A user touches one of the functions in the selectable function list 302 to highlight the selected function. The user then touches the add button 304 to display the highlighted function in the coordinated-function list 303. The user may touch one of the functions in the coordinated-function list 303 to highlight the selected function. The user may then press the remove button 303 to remove the selected function from the coordinated-function list 303. Through these operations, the user displays the functions coordinated with the coordinated apparatus of interest in the coordinated-function list 303. In FIG. 10B, three functions are displayed in the coordinated-function list 303. As the user presses the done button 306, the apparatus coordination control unit 21 of the apparatus A finally selects the functions displayed in the coordinated-function list 303 as the functions to be coordinated with the apparatus selected by the user.

Upon the return button 307 being pressed by the user, the coordinated-apparatus registration screen 201 illustrated in FIG. 10A is displayed again. The user may select another apparatus in the selectable apparatus list 202 to highlight its IP address, thereby determining the functions to be coordinated with the apparatus on an apparatus-by-apparatus basis.

As the user presses the done button 207 in FIG. 10A, the apparatus coordination control unit 21 of the apparatus A finally selects the apparatuses having the displayed IP addresses as the apparatuses to be coordinated. This operation (i.e., pressing the done button 207) corresponds to the process "perform apparatus coordination" of step S2 in FIG. 9.

FIG. 11 is a drawing illustrating an example of a coordinated-apparatus management table stored by the apparatus coordination control unit 21 in the HDD 105 or the like. In a coordinated-apparatus management table 50, functions FUNCTION1 through FUNCTION3 (any number of functions may be provided) are registered such that these functions are associated with the IP address of each coordinated apparatus. According to this coordinated-apparatus management table 50, the apparatus A can use the copy (ver2.0), scanner (ver2.4), and D-Box (ver1.4) of the apparatus B.

It may be noted that the IP address of the apparatus A may not have to be registered in the coordinated-apparatus management table 50 of the apparatus A. However, information about the versions of functions provided in the apparatus A becomes necessary as will be described later. Because of this, the coordinated functions associated with the IP address of the apparatus A are registered in the coordinated-apparatus management table 50.

Referring to FIG. 9 again, as the user presses the done button on the coordinated-apparatus registration screen 201 (S2), the apparatus coordination control unit 21 of the apparatus A receives an instruction to perform apparatus coordination. In response, the apparatus coordination control unit 21 requests the apparatuses B through D registered in the coordinated-apparatus management table 50 to perform apparatus coordination (S2-1, S2-2, S2-3).

This request for apparatus coordination may be a request to activate the apparatus coordination control unit 21 in the apparatuses B through D.

The apparatus coordination control unit 21 requests the apparatuses B through D to only provide information that is to be displayed an the list of user information 30. This is because the caching of all the address information A through D and all the account information A through D ends up requiring excessively large memory size.

Referring to FIG. 9 again, the apparatus coordination control unit 21 of the apparatus A requests the apparatus B to provide address information B and account information B, thereby obtaining such information (S3-1).

In the following, disposing of attributes will be described. When the FAX function is not coordinated with the apparatuses B through D, there is little need for the apparatus A to obtain FAX numbers from the apparatuses B through D. Further, the account information B through D includes function-dependent attributes such as folder transmission function settings (e.g., user-PC IP address and folder name) linked with the folder transmission function. There is little need to store attributes regarding non-coordinated functions as cached data.

In consideration of this, the apparatus coordination control unit 21 disposes of attributes used by non-coordinated functions obtained from the apparatuses B through D. The disposing of attributes means deleting these attributes.

Figure 12A:
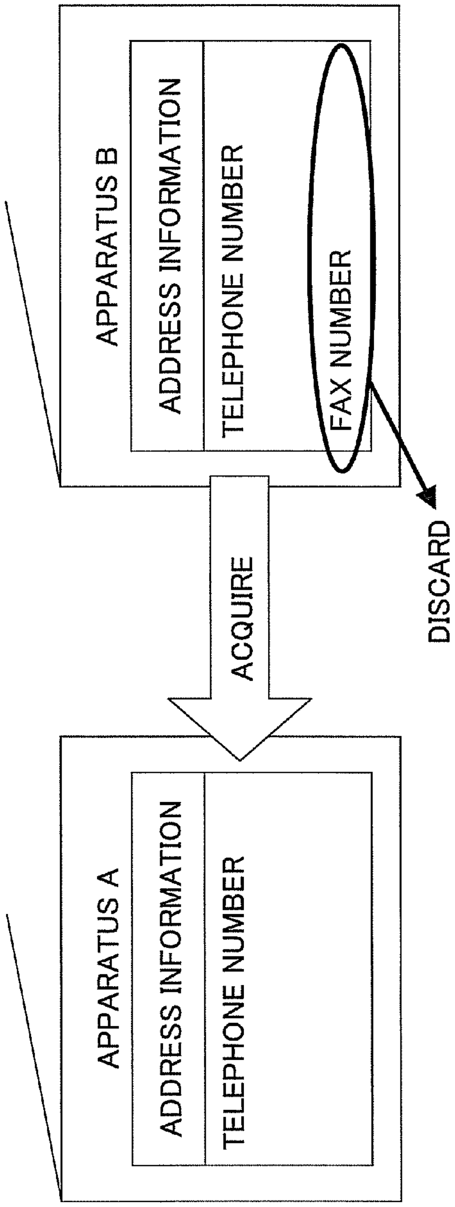
FIGS. 12A and 12B are drawings illustrating an example of disposing of address information B through D or account information B through D of the apparatuses B through D by the apparatus A.
Figure 12B:
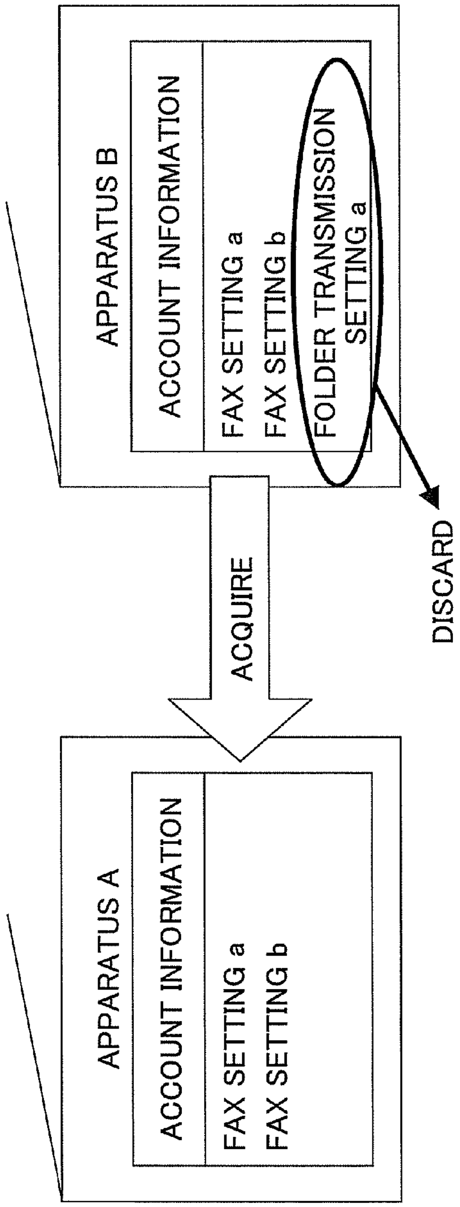

FIGS. 12A and 12B are drawings illustrating an example of disposing of address information B through D or account information B through D of the apparatuses B through D by the apparatus A. In FIG. 12A, the apparatus A has a telephone number as the address information A, and the apparatus B has a telephone number and a FAX number as the address information B. When the FAX function is not subject to coordination, the user information integration unit 25 of the apparatus A disposes of the attribute "FAX number" of the apparatus B.

In an example illustrated in FIG. 12B, the apparatus A has "FAX setting a" and "FAX setting b", and the apparatus B has "FAX setting a", "FAX setting b", and "folder transmission setting a". In this example, the FAX function may be subject to coordination while the folder transmission function is not subject to coordination. In such a case, the user information integration unit 25 of the apparatus A disposes of the attribute "folder transmission setting a" of the apparatus B.

The apparatus A may have prior knowledge of address information attributes and account information attributes that are used by a coordinated function (e.g., as defined in a compatibility check table which will be described later). Alternatively, the address information attributes and account information attributes may be associated with information identifying the function linked with these attributes.

In the above-described example, the apparatus coordination control unit 21 of the apparatus A obtains the user information 30, followed by discarding some of the information. Alternatively, the apparatus coordination control unit 21 may request the apparatuses B through D to only provide the user information 30 that is relevant to the functions to be coordinated.

Referring to FIG. 9 again, the apparatus coordination control unit 21 generates integration-purpose address information 33 (which is empty at this point in time), followed by registering the address information A of the apparatus A in the integration-purpose address information 33, and then adding the address information B of the apparatus B (S3-2). Specifically, the address information A of the apparatus A and the address information B of the apparatus B are stored in the HDD 105 or RAM.

Upon generating the integration-purpose address information 33, the apparatus coordination control unit 21 generates both the attributes contained in the address information A of the apparatus A and the attributes contained in the address information B of the apparatus B. Namely, an attribute is generated if this attribute is contained in either the address information A or the address information B. In this manner, both the address information A of the apparatus A and the address information B of the apparatus B can be added to the integration-purpose address information 33.

Further, the apparatus coordination control unit 21 generates integration-purpose account information 34 (which is empty at this point in time), followed by registering the account information A of the apparatus A in the integration-purpose account information 34, and then adding the account information B of the apparatus B (S3-2).

Upon generating the integration-purpose account information 34, the apparatus coordination control unit 21 generates both the attributes contained in the account information A of the apparatus A and the attributes contained in the account information B of the apparatus B. Namely, an attribute is generated if this attribute is contained in either the account information A or the account information B. In this manner, both the account information A of the apparatus A and the account information B of the apparatus B can be added to the integration-purpose account information 34.

By the same token, the apparatus coordination control unit 21 of the apparatus A requests the apparatus C to provide address information C and account information C, thereby obtaining such information (S4-1). The apparatus coordination control unit 21 adds the address information C and account information C of the apparatus C to the integration-purpose address information 33 and the integration-purpose account information 34, respectively (S4-2).

The apparatus coordination control unit 21 of the apparatus A provides the integration-purpose address information 33 with attributes that are present in the address information C of the apparatus C but not yet present in the integration-purpose address information 33. Further, the apparatus coordination control unit 21 of the apparatus A provides the integration-purpose account information with attributes that are present in the account information C of the apparatus C but not yet present in the integration-purpose account information 34. In this manner, the address information C of the apparatus C is added to the integration-purpose address information 33, and the account information C of the apparatus C is added to the integration-purpose account information 34.

By the same token, the apparatus coordination control unit 21 of the apparatus A requests the apparatus D to provide address information D and account information D, thereby obtaining such information (S5-1). The apparatus coordination control unit 21 adds the address information D and account information D of the apparatus D to the integration-purpose address information 33 and the integration-purpose account information 34, respectively (S5-2).

The apparatus coordination control unit 21 of the apparatus A provides the integration-purpose address information 33 with attributes that are present in the address information D of the apparatus D but not yet present in the integration-purpose address information 33. Further, the apparatus coordination control unit 21 of the apparatus A provides the integration-purpose account information 34 with attributes that are present in the account information D of the apparatus D but not yet present in the integration-purpose account information 34. In this manner, the address information D of the apparatus D is added to the integration-purpose address information 33, and the account information D of the apparatus D is added to the integration-purpose account information 34.

In the manner as described above, the integration-purpose address information 33 and the integration-purpose account information 34 are generated based on the address information A through D and the account information A through D.

FIGS. 13A and 13B are drawings illustrating an example of the integration-purpose address information 33 generated based on the address information A through D illustrated in FIG. 8. FIG. 14 is a drawing illustrating an example of the integration-purpose account information 34. In both types of information, the IP addresses of the apparatuses A through D are registered for the purpose of providing links with the address information A through D of the original apparatuses. Such identifiers do not have to be the IF addresses as long as links with the address information A through D of the original apparatuses are provided, and may be any information that can identify apparatuses on the network.

In the integration-purpose address information 33, attributes are generated from the address information A through D similarly to the manner in which a least common multiple is generated Accordingly, an attribute that is not present in original address information is registered as an entry having no value (i.e., “space”). The same applies in the case of the integration-purpose account information 34.

Referring to FIG. 9 again, the user information integration unit 25 of the apparatus A merges and sorts each of the integration-purpose address information 33 and the integration-purpose account information 34 (S6).

The user information integration unit 25 of the apparatus A then requests the apparatuses B through D to integrate the address information A through D and the account information A through D (S7 to S9). The coordinated apparatuses and functions are the same as those selected for the apparatus A. Accordingly, it suffices for the user information integration unit 25 of the apparatus A to transmit the coordinated-apparatus management table 50 to the apparatuses B through D. The user information integration unit 25 of each of the apparatuses B through D then generates the integration-purpose address information 33 and the integration-purpose account information 34 similarly to the user information integration unit 25 of the apparatus A. The procedure for merge and sort is also the same between the apparatuses A through D.

[Merging of User Names (Removal of Overlap)]

In respect of the present embodiment, a merge operation will be described separately for the merging of user names and the merging of address information A through D attributes or account information A through D attributes. The merging of user names will be described first. The merging of address information A through D attributes or account information A through D attributes will be described later.

Figure 15:
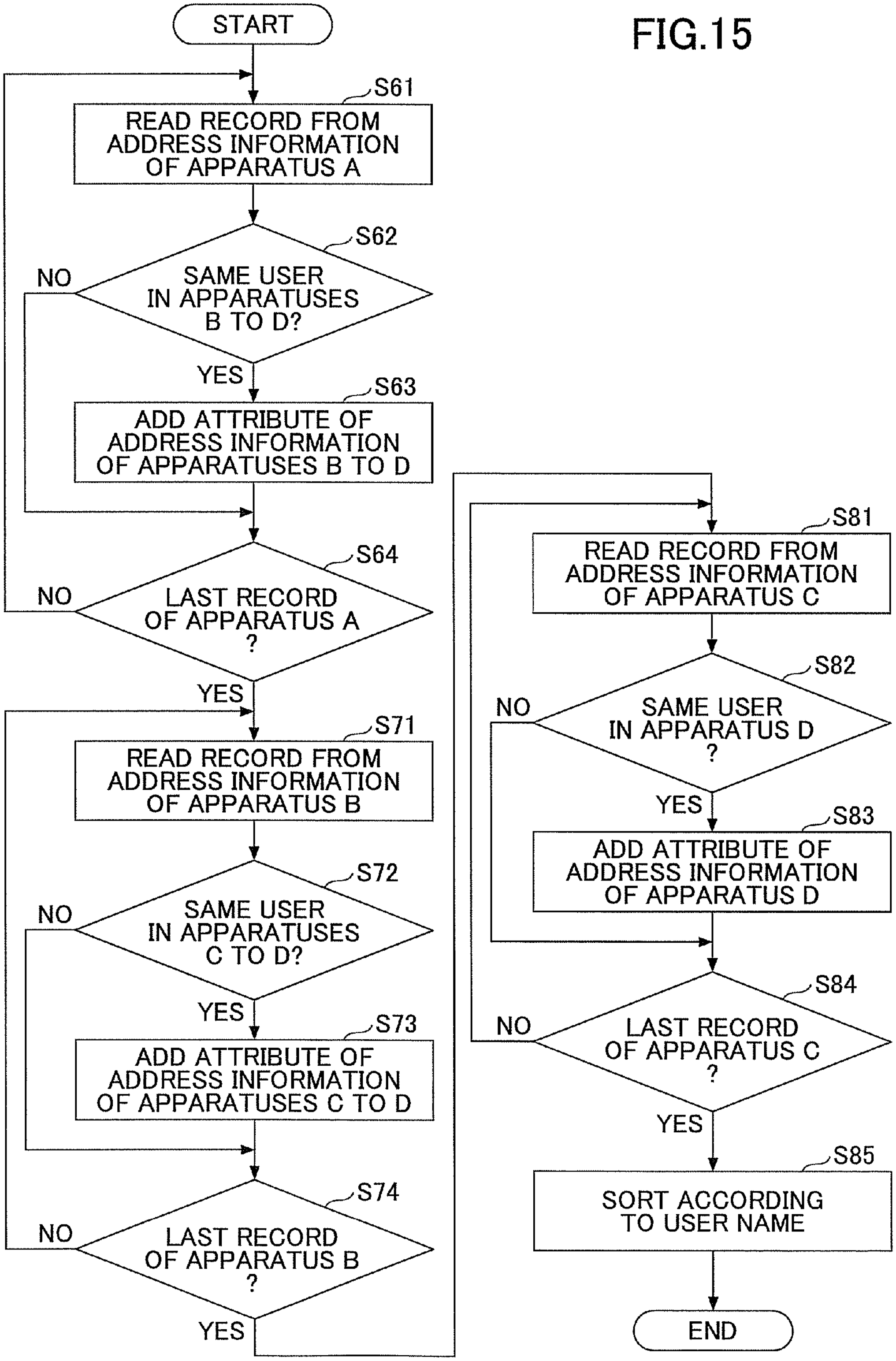
FIG. 15 is a flowchart illustrating an example of the procedure of merging user names in the integration-purpose address information.

FIG. 15 is a flowchart illustrating an example of the procedure of merging user names in the integration-purpose address information 33 in step S6 of FIG. 9. The merging of the integration-purpose account information 34 is similarly performed, and a flowchart thereof will be omitted.

The user information integration unit 25 successively reads a record of the address information A of the apparatus A from the integration-purpose address information 33 (S61).

The user information integration unit 25 checks whether a user name identical to the retrieved user name of the apparatus A exists in the integration-purpose address information 33 (S62). When the identical user names are registered with respect to plural apparatuses, all of them are identified.

When a user name identical to the retrieved user name of the apparatus A exists in the integration-purpose address information 33 (Yes in S62), the user information integration unit 25 adds attributes of the address information B through D of the apparatuses B through D to the retrieved record in the integration-purpose address information 33 (S63). Records having the same user name as the retrieved user name of the apparatus A in the integration-purpose address information 33 do not need to be displayed, and are thus marked with flags or the like for discrimination purposes.

For example, a user A may have FAX numbers registered in both the apparatus A and the apparatus B. The record of this user may appear as the record illustrated in FIG. 13B. When identical functions are coordinated, the same type of attribute may often be registered for the same user. In such a case, the user information integration unit 25 compares values of the attributes to remove one of the attributes or to add the attribute. In FIG. 13B, there are two FAX number attributes. If the two FAX numbers are the same, there is no need to display these two numbers. In such a case, thus, the user information integration unit 25 deletes the attribute of the added address information. If these values differ, the added attribute is left remaining. Similar operations are performed with respect to the remaining attributes (e.g., mail address and the like). The record that originally includes the added attribute is left remaining in the integration-purpose address information 33. The added attribute thus remains linked to the original address information (e.g., B).

The user information integration unit 25 checks whether all the records of the address information A of the apparatus A have been processed (S64). If all the records have been processed (Yes in S64), a similar procedure will be performed with respect to the address information B of the apparatus B.

The user information integration unit 25 successively reads a record of the address information B of the apparatus B from the integration-purpose address information 33 (S71).

The user information integration unit 25 checks whether a user name identical to the retrieved user name of the apparatus B exists in the records of the apparatuses C and D in the integration-purpose address information 33 (S72). When the identical user names are registered with respect to plural apparatuses, all of them are identified.

When a user name identical to the retrieved user name of the apparatus B exists in the records of the apparatuses C and D in the integration-purpose address information 33 (Yes in S72), the user information integration unit 25 adds attributes of the address information C and D of the apparatuses C and D to the retrieved record of the apparatus B in the integration-purpose address information 33 (S73). Address information records having the same user name as the retrieved user name of the apparatus B in the integration-purpose address information 33 do not need to be displayed, and are thus marked with flags or the like for discrimination purposes.

The user information integration unit 25 checks whether all the records of the address information B of the apparatus B have been processed (S74). If all the records have been processed (Yes in S74), a similar procedure will be performed with respect to the address information C of the apparatus C.

The user information integration unit 25 successively reads a record of the address information C of the apparatus C from the integration-purpose address information 33 (S81).

The user information integration unit 25 checks whether a user name identical to the retrieved user name of the apparatus C exists in the records of the apparatus D in the integration-purpose address information 33 (S82). When the identical user names are registered with respect to plural apparatuses, all of them are identified.

When a user name identical to the retrieved user name of the apparatus C exists in the records of the apparatus D in the integration-purpose address information 33 (Yes in S82), the user information integration unit 25 adds attributes of the address information D of the apparatus D to the retrieved record of the apparatus C in the integration-purpose address information 33 (S83). Address information records having the same user name as the retrieved user name of the apparatus C in the integration-purpose address information 33 do not need to be displayed, and are thus marked with flags or the like for discrimination purposes.

The user information integration unit 25 checks whether all the records of the address information C of the apparatus C have been processed (S84). If all the records have been processed (Yes in S84), the user information integration unit 25 sorts the integration-purpose address information 33 according to user names (S85). The use of user names as a sort key is only an example. Sorting may be performed by use of FAX numbers or mail addresses, for example.

In this manner, duplication of user names is eliminated, thereby merging the address information A through D of the apparatuses A through D. Duplication of user names (i.e., overlapping user names) can be eliminated similarly with respect to the integration-purpose account information 34.

[Merging of Attributes]

As was described in connection with FIG. 8 and the like, the coordinated apparatuses may have different installed functions and different option configurations. Because of this, the address information A through D and the account information A through D may differ between the apparatuses A through D. In the following, a description will be given of the method of absorbing such differences. By absorbing differences, the address information A through D and account information A through D of plural apparatuses can be treated in an integrated manner.

Difference in Address Information

The address information A through D is comprised of information indicative of destinations. The address information A through D of an apparatus having no FAX function does not include FAX numbers. In FIGS. 13A and 13B, items that are not included as the address information A through D are shown as having an entry value of "space".

When plural apparatuses are coordinated, the FAX function provided in one of the apparatuses may be made usable in all the coordinated apparatuses. In such a case, the user information integration unit 25 adds a FAX-number attribute to the address information A through D that does not originally include a FAX number. The user information integration unit 25 then sets "NULL" to the FAX number such that the FAX number is not treated as an undefined value. The value "NULL" is an invalid value (i.e., predefined fixed value), which can be processed by the apparatus 100 without an error, or can be recognized as a value that does not need to be displayed.

FIG. 16 is a drawing illustrating an example of list-purpose address information 41 which is obtained by setting "NULL" in the integration-purpose address information 33 illustrated in FIG. 13.

Further, IDs that are unique within the list-purpose address information 41 are assigned in the list-purpose address information 41. With this arrangement, each record can be uniquely identified in the list-purpose address information 41. Despite the differences in IDs between the list-purpose address information 41 and the integration-purpose address information 33, the records of the list-purpose address information 41 can be matched to the records of the integration-purpose address information 33 by using the user names and IP addresses of apparatuses.

As was previously described, when a function belonging to a given apparatus is not subject to coordination, the attributes of the address information A through D used by such a function are not integrated (i.e., are discarded). The integration-purpose address information 33 thus does not include such a function.

Differences in Account Information

The account information A through D includes an essential attribute such as a user name (i.e., account name) that is used in common by the coordinated apparatuses, and also includes an attribute that is defined separately for each user or for each function provided in an apparatus. The latter attribute will hereinafter be referred to as an “extension function attribute”. An extension function attribute may be registered or not registered depending on the apparatus.

Figure 17A:
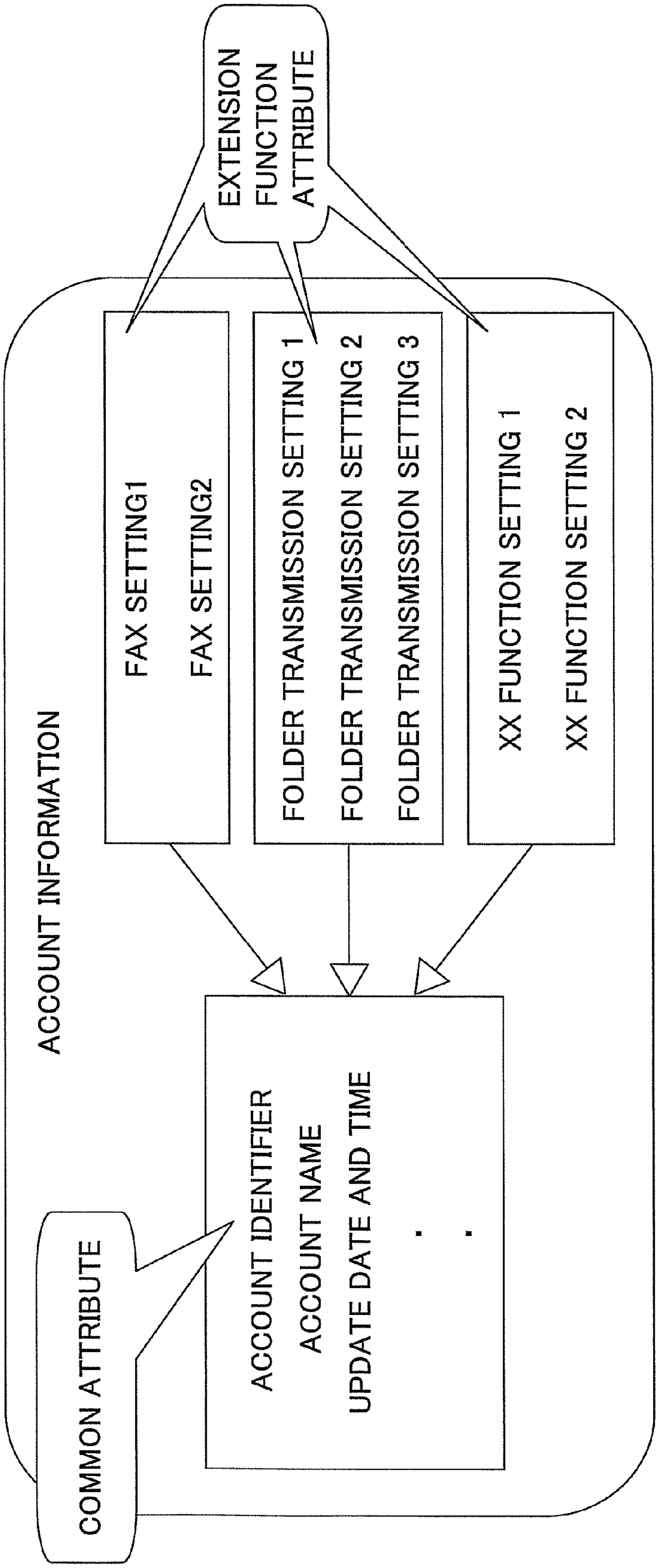
FIGS. 17A and 17B are drawings illustrating an example of essential attributes and extension function attributes.
Figure 17B:
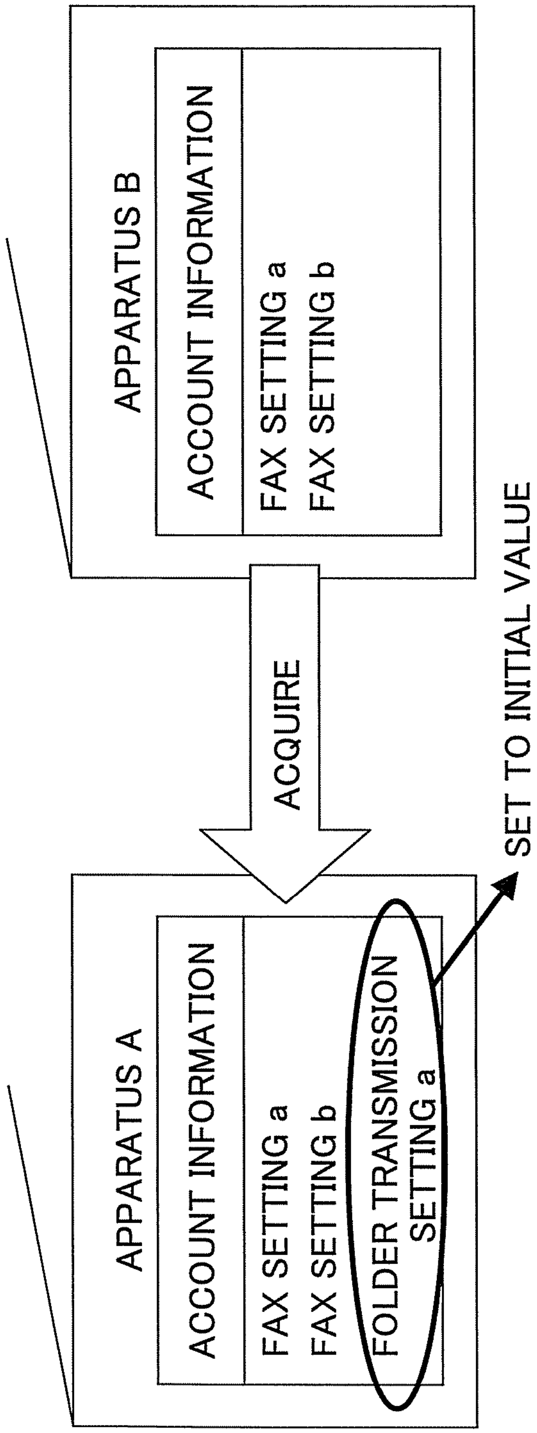

FIGS. 17A and 17B are drawings illustrating an example of essential attributes and extension function attributes. An account identifier (i.e., user ID), an account name (i.e., user name), and an update date and time illustrated in FIG. 17A are essential attributes. “FAX SETTING1” to “FAX SETTING2”, “FOLDER TRANSMISSION SETTING1” to “FOLDER TRANSMISSION SETTING3”, and “XX FUNCTION SETTING1” to “XX FUNCTION SETTING2” are extension function attributes.

Similarly to the address information A through D, there is a need to absorb differences in the account information A through D when an apparatus to be coordinated does not have an extension function attribute. In the following, a description will be given separately of case (1) and case (2).

(1) Case in which a Recipient Apparatus has a Function while a Providing Apparatus does not have this Function FIG. 17B is a drawing illustrating an example of integrating the account information A and B when the apparatus A receives the account information B of the apparatus B.

The apparatus A has a function that the apparatus B does not have. The apparatus A has “FAX setting a”, “FAX setting b”, and “folder transmission setting a”, and the apparatus B has “FAX setting a” and “FAX setting b”. A function that is provided only in the apparatus A uses the attribute “folder transmission setting a”. When the apparatus A and the apparatus B are coordinated, and the apparatus A uses the account information B of the apparatus B, the apparatus A has the attribute “folder transmission setting a” that is not in existence in the apparatus B.

In this case, the user information integration unit 25 of the apparatus A sets an initial value to the attribute that is not in existence in the providing apparatus B that provides the account information. The initial value that is referred to herein may be a typical value for resolution and density for the attribute “FAX setting”, or may be a default folder name (e.g., /personal_cabinet/work) for the attribute “folder transmission setting”. With this arrangement, the apparatus A can utilize the account information B of the apparatus B upon merging the account information B of the apparatus B.

Conversely, some attribute may exist in the apparatus B while it does not exist in the apparatus A. The apparatus coordination control unit 21 of the apparatus A provides the integration-purpose account information 34 with an attribute that is in existence only in the apparatus B, and sets a “space” code to such an attribute. In this case, the user information integration unit 25 of the apparatus A sets an initial value to the attribute that is in existence only in the providing apparatus B that provides the account information. In this manner, an initial value is set to an attribute in both the case in which the attribute is in existence in the apparatus A but not in the apparatus B and the case in which the attribute is in existence in the apparatus B but not in the apparatus A.

(2) Regarding Compatibility of Identical Functions

Some attribute of the account information A through D can be used in another apparatus while another attribute cannot be used in another apparatus even when these attributes belong to the same function. This occurs due to the problem of lack of compatibility. In consideration of this, the apparatuses A through D refer to a compatibility check table 60 to check whether the account information A through D is compatible.

FIG. 18 is a drawing illustrating an example of the compatibility check table 60. The compatibility check table 60 may be stored in the HDD 105 of each apparatus, or may be downloaded from a server.

In the compatibility check table 60, a relevant function and compatibility are registered on an attribute-specific basis. An account identifier, an account name, an update date and time, and a creation date and time are essential attributes. The remaining attributes are extension function attributes. A setting indicative of the G3 standard or the G4 standard is made for the attribute “FAX transmission mode”. A setting indicative of a telephone line or an IP-FAX line is made for the attribute “FAX communication line type”. A setting indicative of a transmission protocol (e.g., FTP or SNTP) is made for the attribute “folder transmission protocol type”. A setting indicative of a folder path is made for the attribute “folder transmission path”.

The entry “relevant function” refers to the function that uses the corresponding attribute. The FAX function uses the attributes “FAX transmission mode” and “FAX communication line type”. The folder transmission function uses the attributes “folder transmission protocol type” and “folder transmission path”.

The entry “compatibility” indicates an application version number that ensures compatibility for the account information A through D with respect to each attribute. The entry “compatibility up to ver2.0” indicates that the corresponding attribute is compatible if the version number of the function of a coordinated apparatus is no larger than 2.0. This “compatibility” may be represented as being no larger than the version of the local apparatus, for example.

As specific examples, the compatibility of scanner function attributes may be concerned with a resolution setting, the availability of a color scan function, a convertible image data format, etc. The compatibility of a FAX function may be concerned with a usable standard such as G3 or G4, an available communication line, etc.

It should be noted that compatibility is ensured for all the coordinated apparatuses with respect to essential attributes. The entry “compatibility” for essential attributes is thus set to the symbol “–”, which indicates “Not Applicable”.

In this manner, the address information A through D and the account information A through D may differ in terms of the contents thereof, depending on the functions provided in the apparatuses A through D. In addition, the compatibility of the contents may not be guaranteed, depending on the version of the function even if the same function is provided in the apparatuses A through D. In consideration of this, the user information integration unit 25 merges the account information A through D by taking into account version differences upon acquiring the account information A through D. Version differences have been described with respect to the account information 32 FIG. 18. Incompatible attributes may also occur due to version differences in the case of the address information 31. In the case of the address information 31, the effect of version differences on attributes is small. In the following, a description will be given of the absorption of version differences with respect to the account information 32.

Figure 19A:
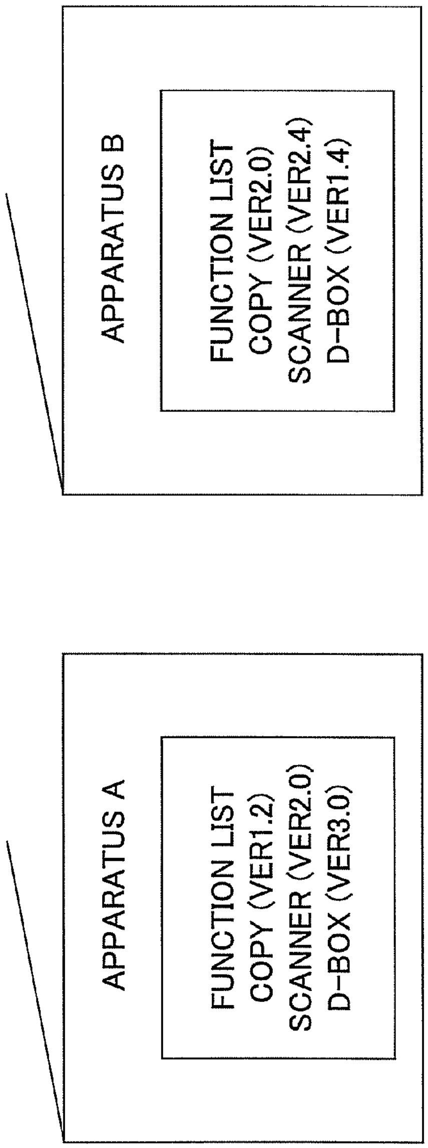
FIGS. 19A and 19B are drawings illustrating an example of merging address information and account information by taking into account version differences.
Figure 19B:
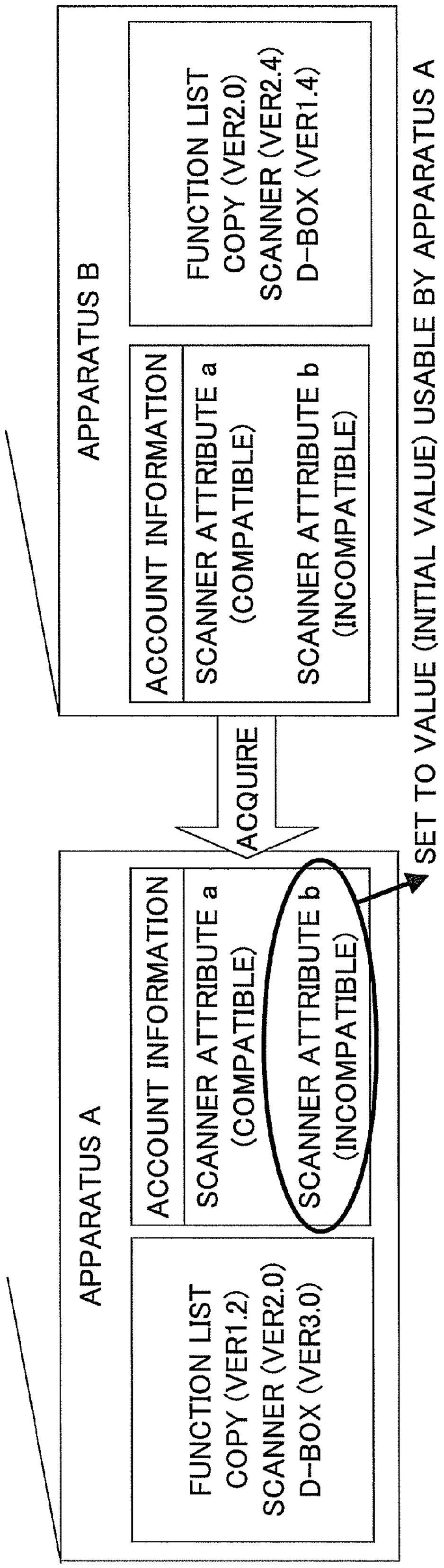

FIG. 19A is a drawing illustrating an example of merging the address information A through D and account information A through D by taking into account version differences. The apparatus A has a copy (ver1.2) function, a scanner (ver2.0) function, and a D-Box (ver3.0) function. The apparatus B has, a FAX (ver2.0) function, a scanner (ver2.4) function, and a D-Box (ver1.4) function.

Accordingly, the scanner (ver2.0) and the scanner (ver2.4) have different version numbers, and, also, the D-Box (ver1.4) and the D-Box (ver3.0) have different version numbers. The user information integration unit 25 refers to the compatibility check table 60 to detect that the FAX function provides compatibility only up to version 1.0. The user information integration unit 25 thus determines that the attributes “FAX transmission mode” and “FAX communication line type” of the apparatus B are not compatible for the scanner (ver2.0) of the apparatus A.

When there is no compatibility for a given attribute, the user information integration unit 25 of the apparatus A sets an initial value to the given attribute of the account information B of the apparatus B similarly to the case in which the apparatus B does not have the given attribute.

FIG. 19A is a drawing illustrating an example of acquiring account information when some attribute does not have compatibility. The apparatus A has scanner attributes a and b. The scanner attribute a is compatible while the scanner attribute b is not compatible. Even though the apparatus B has the scanner attributes a and b, the user information integration unit 25 of the apparatus A sets an initial value usable by the apparatus A to the scanner attribute b of the apparatus B in the integration-purpose account information 34.

With this arrangement, setting an unusable attribute due to a function (application) version difference can be avoided.

FIG. 20 is a drawing illustrating an example of list-purpose account information 42 which is obtained by setting initial values in the integration-purpose account information 34 illustrated in FIG. 14. IDs that are unique within the list-purpose account information 42 are assigned in the list-purpose account information 42. With this arrangement, each record can be uniquely identified in the list-purpose account information 42. These IDs are the same as the IDs used in the list-purpose address information 41 (i.e., the same user has the same ID).

Despite the differences in IDs between the list-purpose account information 42 and the integration-purpose account information 34, the records of the list-purpose account information 42 can be matched to the records of the integration-purpose account information 34 by using the user names and IP addresses of apparatuses.

The apparatuses A, C, and D do not have the folder transmission function, so that the attribute “folder transmission setting” is set to initial values. The apparatus B does not have the FAX function, so that the attribute “FAX setting” is set to initial values. The apparatuses A and D both have the FAX function, but their applications may not be compatible due to a version difference. In this case, the apparatus A sets an initial value to the attribute “FAX setting” of the apparatus D.

FIG. 21 is a drawing illustrating an example of the list-purpose address information 41 provided in the apparatuses A through D. The list-purpose address information 41 of FIG. 21 is the same as the one illustrated in FIG. 16. Since the apparatus A does not have the mail transmission function, the mail address is set to “NULL” with respect to users A to D, G, and H. Since the apparatus C does not have the FAX function, the FAX number is set to “NULL” with respect to users E and F.

The list-purpose address information 41 provided in the apparatuses B through D is omitted from the illustration, but is the same as the list-purpose address information 41 provided in the apparatus A. This is because the apparatus A merges the address information B through D of the apparatuses B through D similarly to the manner in which a least common multiple is generated, and also because the apparatus B merges the address information A, C, and D of the apparatuses A, C, and D similarly to the manner in which a least common multiple is generated. The same applies in the case of the apparatuses C and D. When version information of functions is taken into account, the list-purpose address information 41 may differ in some cases between the apparatuses A through D.

[Procedure of Generating List-Purpose Address Information or List-Purpose Account Information]

Figure 22:
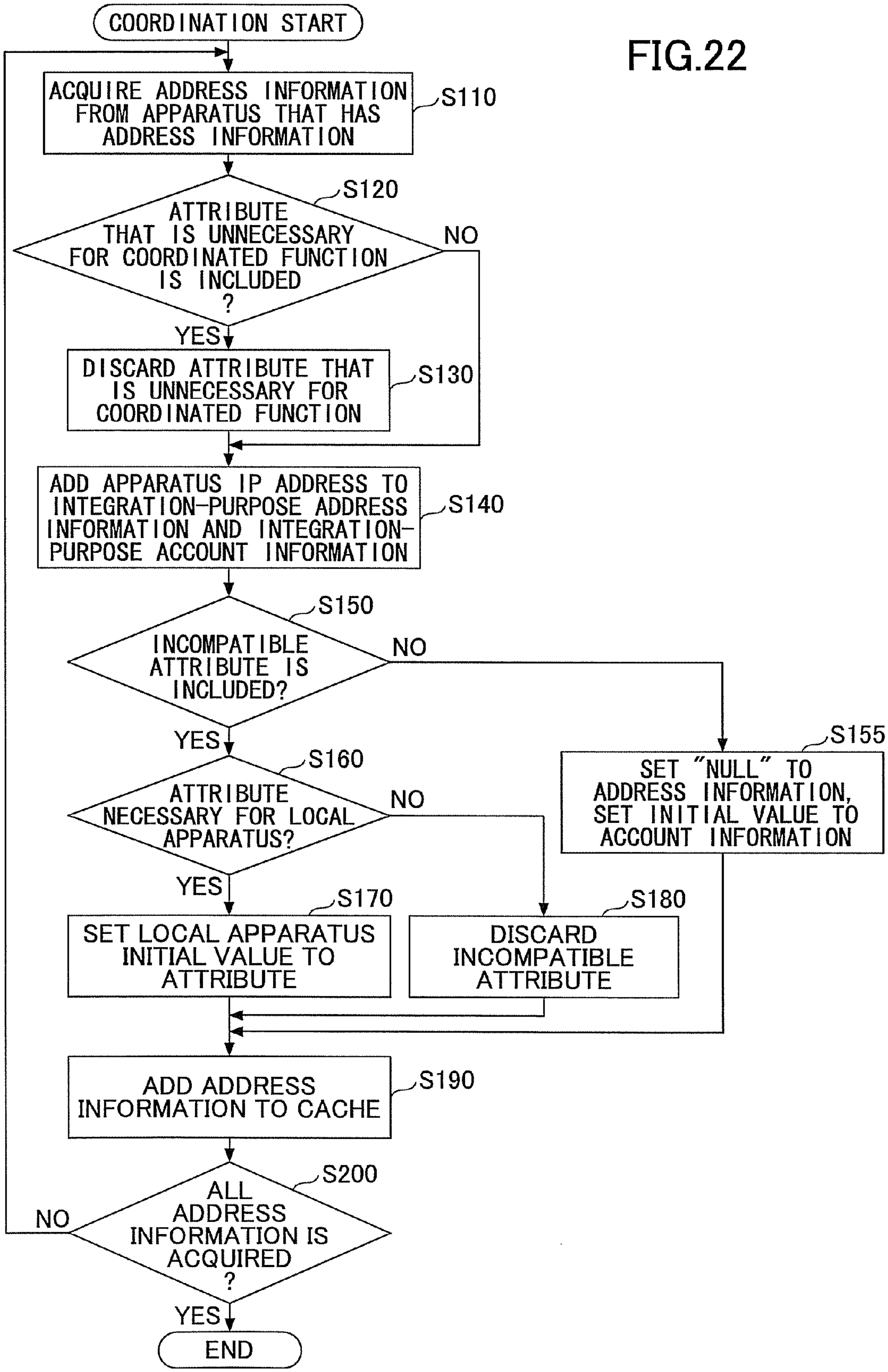
FIG. 22 is a flowchart illustrating an example of the procedure performed by the user information integration unit to generate the list-purpose address information or the list-purpose account information.

FIG. 22 is a flowchart illustrating an example of the procedure performed by the user information integration unit 25 to generate the list-purpose address information 41 or the list-purpose account information 42. The procedure described in the following may mainly be performed by the user information integration unit 25 or the apparatus coordination control unit 21. This procedure may be solely performed by the user information integration unit 25 or solely performed by the apparatus coordination control unit 21.

The apparatus coordination control unit 21 acquires the address information B through D and the account information B through D from the apparatuses B through D (S110). The address information B through D and the account information B through D are temporarily stored in the HDD 105.

The apparatus coordination control unit 21 then retrieves records of the address information B through D and the account information B through D one by one.

The apparatus coordination control unit 21 refers to the coordinated-apparatus management table 50 to check whether the retrieved record of the address information B through D or the account information B through D includes an attribute that is not used by the coordinated functions (S120).

If the retrieved record includes an attribute that is not used by the coordinated functions (Yes in S120), the apparatus coordination control unit 21 removes this attribute from the record. This is equivalent to the disposing of the attribute.

The apparatus coordination control unit 21 integrates the address information A through D and the account information A through D to generate the integration-purpose address information 33 and the integration-purpose account information 34. Steps S110 through S130 correspond to steps S3-1, S4-1, and S5-1 of FIG. 9.

The apparatus coordination control unit 21 then registers IP addresses in the records of the integration-purpose address information 33 and the records of the integration-purpose account information 34 (S140). The apparatus coordination control unit 21 also eliminates the overlapping of user names.

The user information integration unit 25 refers to the compatibility check table 60 to identify the functions identical to the local functions, and checks on a function-by-function basis whether the attributes used by the function are compatible (S150).

If an attribute is compatible (No in S150), the user information integration unit 25 uses a value of the attribute provided in the address information as the attribute value. The user information integration unit 25 sets “NULL” to the attribute if the attribute of the address information does not have a value. The user information integration unit 25 uses a value of the attribute provided in the account information as the attribute value. The user information integration unit 25 sets an initial value to the attribute if the attribute of the account information does not have a value. This corresponds to step S155. The procedure then proceeds to step S190.

If an attribute is not compatible (Yes in S150), the user information integration unit 25 checks whether the attribute is necessary in the local apparatus (S160). The attribute that is necessary but incompatible is a usable attribute that is not compatible according to the compatibility check table 60.

If the attribute is not necessary in the local apparatus (No in S160), the user information integration unit 25 removes the incompatible attribute from the integration-purpose address information 33 (S180). This is equivalent to the disposing of the attribute.

If the attribute is necessary in the local apparatus (Yes in S160), the user information integration unit 25 sets an initial value to the attribute (S170). The processes in steps S150 to S180 correspond to step S6 in FIG. 9.

The user information integration unit 25 registers the records of the integration-purpose address information 33 to the list-purpose address information 41 by attaching apparatus IP addresses and IDs, and registers the records of the integration-purpose account information 34 to the list-purpose account information 42 by attaching apparatus IP addresses and IDs (S190).

A check is then made as to whether all the records of the integration-purpose address information 33 and the integration-purpose account information 34 have been processed (S200). If all the records of the integration-purpose address information 33 and the integration-purpose account information 34 have been processed (Yes in S200), the procedure of FIG. 22 comes to an end.

[Sequence of Displaying List]

Figure 23:
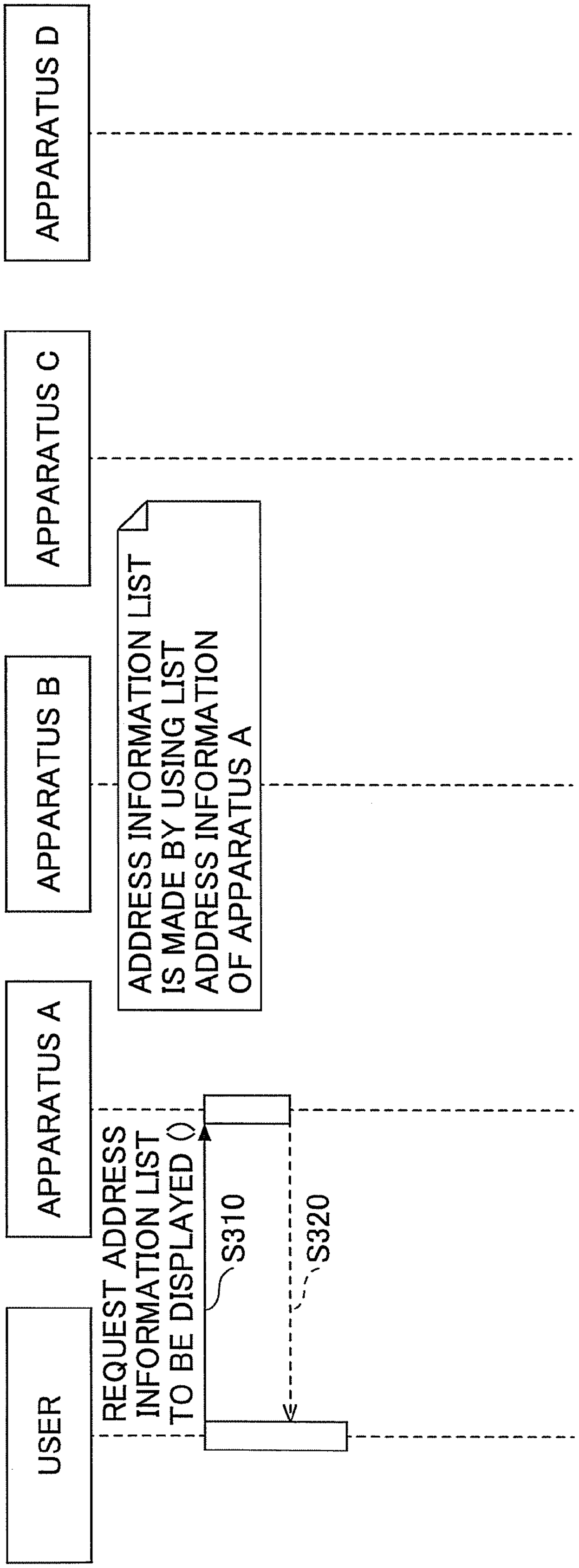
FIG. 23 is a drawing illustrating an example of the procedure performed by the apparatus coordination control unit to display a list of user information.

FIG. 23 is a drawing illustrating an example of the procedure performed by the apparatus coordination control unit 21 to display a list of user information 30. Through the processes performed heretofore, the list-purpose address information 41 and the list-purpose account information 42 are stored in each of the apparatuses A through D.

When a user uses the list-purpose address information 41 in apparatus coordination, the user operates the operation panel 130 of the apparatus A to display a list of address information (S310).

The apparatus coordination control unit 21 reads the list-purpose address information 41 stored in the HDD 105 to display the information on the operation panel 130 (S320).

Figure 24:
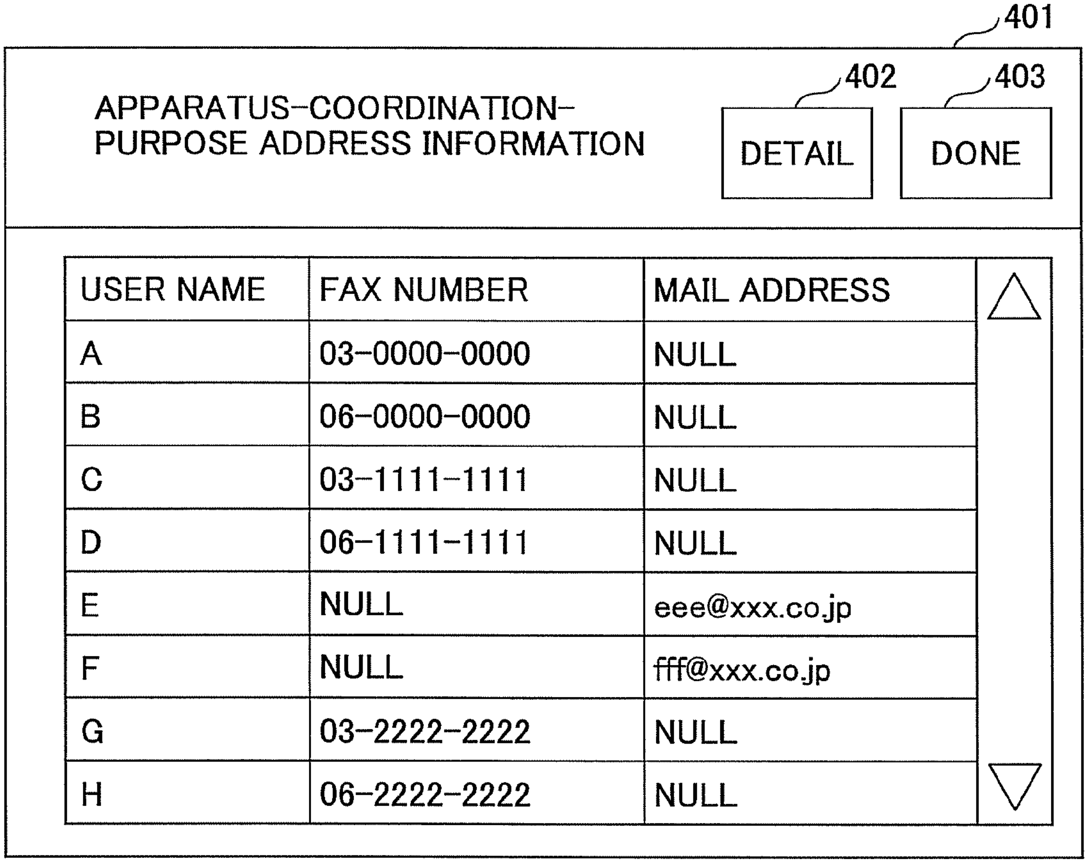
FIG. 24 is a drawing illustrating an example of an address information screen displayed on the operation panel.

FIG. 24 is a drawing illustrating an example of an address information screen 401 displayed on the operation panel 130. In the address information screen 401, a FAX number and a mail address are displayed such that they are associated with a user name. The user presses a user name to whom the user wishes to send image data, thereby highlighting the selected user name. The user then presses the done button to cause the UI layer 11 to accept the user choice. In this manner, the apparatus A transmits the image data to the selected user.

Accordingly, the user at the apparatus A can utilize the address information B through D of the apparatuses B through D. There is no need to use a directory server. The address information screen 401 may display IDs and IP addresses although such items may not be needed under ordinary circumstances.

[Sequence for Detailed Display]

As was previously described, the apparatus coordination control unit 21 only caches information necessary for generating the list-purpose address information 41. When a user requires the detailed information of the address information A through D and account information A through D, the apparatus A requests the apparatuses B through D to provide such detailed information.

Figure 25:
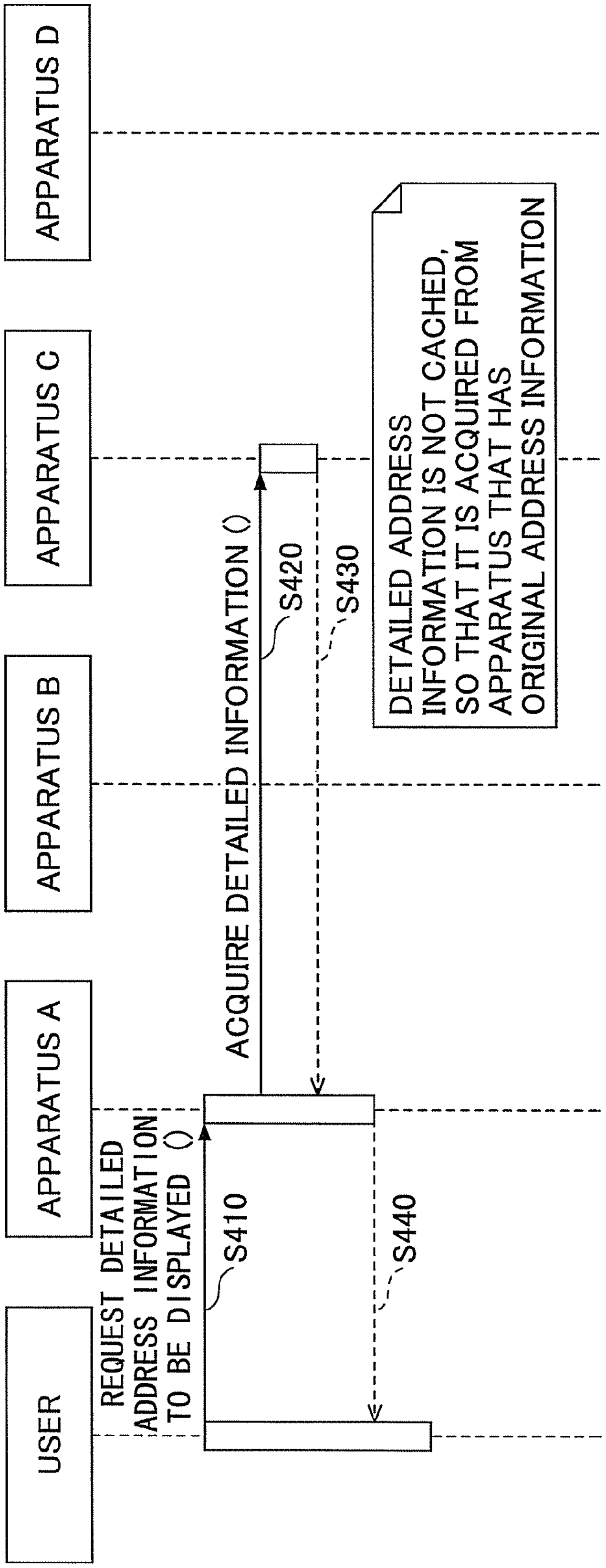
FIG. 25 is a drawing illustrating an example of the procedure performed by the apparatus coordination control unit to display detailed user information.

FIG. 25 is a drawing illustrating an example of the procedure performed by the user information integration unit 25 to display detailed user information 30. A user highlights a user name on the address information screen 401, and then presses a detail button 402, which constitutes a detailed-address-information display request illustrated in FIG. 25 (S410).

Based on the selected user name, the user information integration unit 25 of the apparatus A identifies from the list-purpose address information 41 an apparatus in which the user information 30 about the selected user is originally registered. In an example illustrated in FIG. 25, the apparatus C is identified.

The apparatus coordination control unit 21 transmits the user ID unique within the apparatus C to the apparatus C, and also requests detailed information (S420)

The user information integration unit 25 of the apparatus C reads the user information 30 stored in the HDD 105 to transmit detailed information to the apparatus A (S430). The detailed information may include a date of registering, a date of updating, a person who registered, and a PC used to register the address information A through D.

Upon the detailed information being received by the apparatus A, the user information integration unit 25 displays on the operation panel 130 the detailed information of the address information A through D about the selected user.

With this arrangement, even though part of the user information 30 has already been cached, user can further obtain detailed information of the user information 30.

[Sequence of Updating User Information]

A user may update the user information 30. Since the user information 30 of the apparatuses A through D is cached in each of the apparatuses A through D, the user can update the user information 30 by operating any one of the apparatuses. Since the original user information 30 is stored in only one of the apparatuses, there may be a need to update this original user information 30 by accessing this apparatus. Further, the list-purpose address information 41 and the list-purpose account information 42 need to be also updated at the apparatuses that store the relevant user information 30, so that a user can properly operate any one of these apparatuses.

Figure 26:
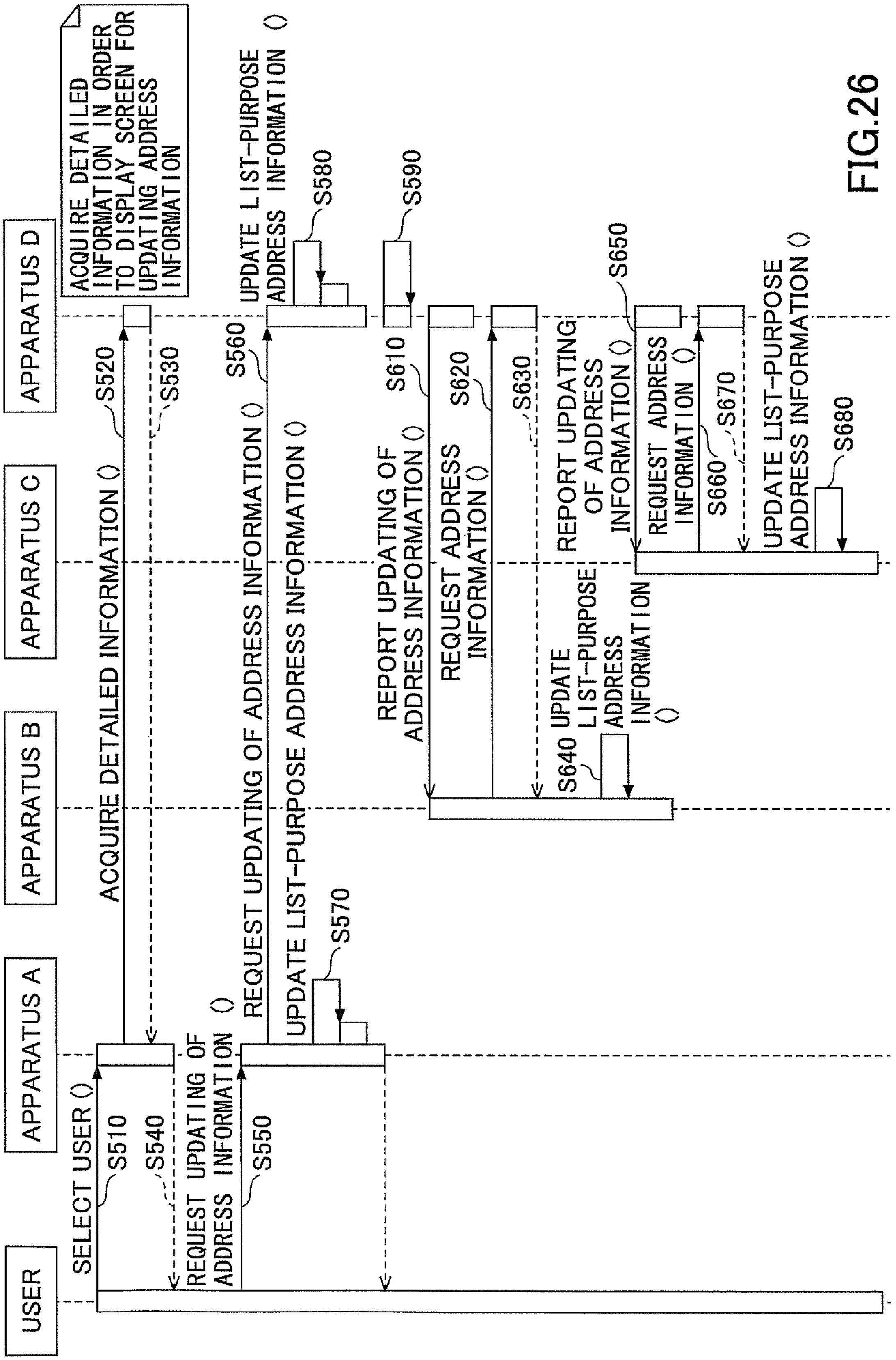
FIG. 26 is a drawing illustrating an example of the procedure performed by the apparatus coordination control unit to update user information.

FIG. 26 is a drawing illustrating an example of the procedure performed by the user information integration unit 25 to update the user information 30.

A user displays an initial setting screen on the operation panel 130, for example, followed by selecting a user similarly to the manner in which selection is made by use of the address information screen 401 (S510).

Based on the selected user name, the user information integration unit 25 of the apparatus A identifies from the list-purpose address information an apparatus in which the user information 30 about the selected user is originally registered. In an example illustrated in FIG. 26, the apparatus D is identified.

The user information integration unit 25 transmits the user ID unique within the apparatus D to the apparatus D, and also requests the user information 30 inclusive of detailed information (S520).

The user information integration unit 25 of the apparatus D reads the user information 30 stored in the HDD 105 to transmit the user information 30 inclusive of detailed information to the apparatus A (S530). The user information integration unit 25 displays the user information 30 on the operation panel 130 (S540).

By using the user information 30 displayed on the initial setting screen as a reference, the user enters attributes of updated address information (e.g., a new FAX number, a new mail address, and the like). Upon the done button being pressed, the UI layer 11 accepts the update request (S550).

The user information integration unit 25 of the apparatus A transmits the user ID and the attributes of updated address information to the apparatus C, and also requests that the attributes of the original address information D be updated (S560).

Further, the user information integration unit 25 of the apparatus A updates the list-purpose address information 41 identified by the ID of the user with the entered attributes of updated address information (S570).

The user information integration unit 25 of the apparatus D updates the list-purpose address information 41 identified by the ID of the user with the received attributes of updated address information (S580).

Since the apparatus D stores the original address information D, the user information integration unit 25 of the apparatus D updates the original address information D identified by the ID of the user with the received attributes of updated address information (S590).

Further, the user information integration unit 25 of the apparatus D requests the apparatus B to update the list-purpose address information 41 (S610). In response to this request, the user information integration unit 25 of the apparatus B requests the apparatus D to send the attributes of updated address information (S620). The user information integration unit 25 of the apparatus D transmits the user ID and the updated address information to the apparatus B (S630).

The user information integration unit 25 of the apparatus B updates the list-purpose address information 41 identified by the ID of the user with the received attributes of updated address information (S640).

Similarly, the user information integration unit 25 of the apparatus D requests the apparatus C to update the list-purpose address information 41 (S650). In response to this request, the user information integration unit 25 of the apparatus C requests the apparatus D to send the attributes of updated address information (S660). The user information integration unit 25 of the apparatus D transmits the user ID and the attributes of updated address information to the apparatus C (S670).

The user information integration unit 25 of the apparatus C updates the list-purpose address information 41 identified by the ID of the user with the received attributes of updated address information (S680).

Through the procedure described above, the user operating the apparatus A can update the original address information D stored in the apparatus D and the list-purpose address information 41 cached in each of the apparatuses A through D.

As described heretofore, the apparatus 100 of the present embodiment integrates user information without using a server, thereby making it possible for each of the apparatuses A through D to utilize another one of the apparatuses A through D.

Further, the present invention is not limited to these embodiments, but various variations and modifications may be made without departing from the scope of the present invention.

The present application is based on Japanese priority application No. 2010-129163 filed on Jun. 4, 2010, with the Japanese Patent Office, the entire contents of which are hereby incorporated by reference.

What is claimed is:

1. An image forming apparatus configured to be connected to one or more other image forming apparatuses through a network, comprising:

a user information storing unit to store local image forming apparatus user information about the image forming apparatus;

an apparatus information storing unit to store information indicative of the one or more other image forming apparatuses;

a user information acquiring unit to acquire remote image forming apparatus user information from the one or more other image forming apparatuses indicated by the information stored in the apparatus information storing unit;

a user information integration unit to merge the local image forming apparatus user information and the remote image forming apparatus user information to generate display-purpose user information to be displayed on a screen, and to transmit the local image forming apparatus user information to the one or more other image forming apparatuses with a request to generate display-purpose user information, wherein the user information includes account information in which a user ID to log in any one of the image forming apparatus and the one or more other image forming apparatuses and a setting value settable for each function of the any one of the image forming apparatus and the one or more other image forming apparatuses are registered according to each user of the image forming apparatus and the one or more other image forming apparatuses, and an apparatus coordination unit to perform a job by utilizing a function of the image forming apparatus and a function of at least one of the one or more other image forming apparatuses; and a selection receiving unit to receive information indicative of the at least one of the one or more other image forming apparatuses and information indicative of the function of the at least one of the one or more other image forming apparatuses.

2. The image forming apparatus as claimed in claim 1, wherein the user information integration unit sets a predefined fixed value to an attribute of address information that is included in the remote image forming apparatus user information but not included in the local image forming apparatus user information, and sets the predefined fixed value to an attribute of address information that is included in the local image forming apparatus user information but not included in the remote image forming apparatus user information.

3. The image forming apparatus as claimed in claim 2, wherein the display-purpose user information generated by the image forming apparatus is identical to the display-purpose user information generated by the one or more other image forming apparatuses.

4. The image forming apparatus as claimed in claim 2, further comprising a compatibility information storing unit to store, separately for each of a plurality of attributes, compatibility information about compatibility between different versions of a function that uses an attribute, wherein the user information integration unit reads the compatibility information corresponding to a certain attribute included in the remote image forming apparatus user information to check whether the certain attribute is compatible based on information indicative of a version of a relevant function used in the one or more other image forming apparatuses, and wherein the user information integration unit uses a value of the certain attribute for the display-purpose user information upon detecting that the certain attribute is compatible.

5. The image forming apparatus as claimed in claim 4, wherein the user information integration unit sets an initial value to the certain attribute for the display-purpose user information upon detecting that the certain attribute is not compatible.

6. The image forming apparatus as claimed in claim 1, wherein the user information integration unit sets an initial value to an attribute of a function that is included in the remote image forming apparatus user information but not included in the local image forming apparatus user information, and sets an initial value to an attribute of a function that is included in the local image forming apparatus user information but not included in the remote image forming apparatus user information.

7. The image forming apparatus as claimed in claim 1, further comprising an attribute-function information storing unit to store, separately for each of a plurality of attributes, information indicative of a function that uses an attribute, wherein the user information acquiring unit discards a given attribute included in the remote image forming apparatus user information acquired from the at least one of the one or more other image forming apparatuses, upon detecting that the given attribute is not used by the function of the at least one of the one or more other image forming apparatuses.

8. The image forming apparatus as claimed in claim 1, further comprising a display unit to display the display-purpose user information generated by the user information integration unit without discriminating the remote image forming apparatus user information from the local image forming apparatus user information.

9. The image forming apparatus as claimed in claim 1, wherein a record of the display-purpose user information generated by the user information integration unit includes link information that links the remote image forming apparatus user information included in the display-purpose user information to a corresponding one of the one or more other image forming apparatuses.

10. The image forming apparatus as claimed in claim 9, wherein the user information integration unit receives an indication of selection of a user from the display-purpose user information displayed on the screen, followed by identifying, based on the link information, one of the one or more apparatuses that stores the remote image forming apparatus user information regarding the selected user, and then acquiring information attached to the remote image forming apparatus user information regarding the selected user from the identified one of the one or more other image forming apparatuses.

11. The image forming apparatus as claimed in claim 9, wherein upon receiving an entered updated attribute of the remote image forming apparatus user information, the user information integration unit updates the display-purpose user information with the updated attribute, followed by identifying, based on the link information, one of the one or more other image forming apparatuses that stores the remote image forming apparatus user information corresponding to the updated attribute, and then transmitting to the identified one of the one or more other image forming apparatuses the updated attribute and user identification information used by the identified one of the one or more other image forming apparatuses together with a request to update the remote image forming apparatus user information.

12. The image forming apparatus as claimed in claim 1, wherein the local image forming apparatus user information includes, on a user-specific basis, at least one of information indicative of a destination to which image data is transmitted, information for logging into the image forming apparatus, and account information inclusive of function settings.

13. A method of generating information for an apparatus which is connected to one or more other image forming apparatuses through a network, and includes a user information storing unit to store local image forming apparatus user information about one or more users of the apparatus, and an apparatus information storing unit to store information indicative of the one or more other image forming apparatuses, the method comprising:

acquiring, by use of a user information acquiring unit, remote image forming apparatus user information from the one or more other image forming apparatuses indicated by the information stored in the apparatus information storing unit; and merging, by use of a user information integration unit, the local image forming apparatus user information and the remote image forming apparatus user information to generate display-purpose user information to be displayed on a screen, and transmitting the local image forming apparatus user information to the one or more other image forming apparatuses with a request to generate display-purpose user information, wherein the user information includes account information in which a user ID to log in any one of the image forming apparatus and the one or more other image forming apparatuses and a setting value settable for each function of each of the one or more other image forming apparatuses are registered according to each user of the one or more other image forming apparatuses, performing a job by utilizing a function of the image forming apparatus and a function of at least one of the one or more other image forming apparatuses; and receiving information indicative of the at least one of the one or more other image forming apparatuses and information indicative of the function of the at least one of the one or more other image forming apparatuses.

14. A system in which plural image forming apparatuses are connected through a network, a first one of the image forming apparatuses comprising:

a user information storing unit to store local image forming apparatus user information about one or more users of the first one of the image forming apparatuses;

an apparatus information storing unit to store information indicative of a second one of the image forming apparatuses;

a user information acquiring unit to acquire remote image forming apparatus user information stored in the second one of the image forming apparatuses from the second one of the image forming apparatuses indicated by the information stored in the apparatus information storing unit; and a user information integration unit to merge the local image forming apparatus user information and the remote image forming apparatus user information to generate display-purpose user information to be displayed on a screen, and to transmit the local image forming apparatus user information to the second one of the image forming apparatuses with a request to generate display-purpose user information, wherein the user information includes account information in which a user ID to log in any one of the plural image forming apparatuses and a setting value settable for each function of each of the plural image forming apparatuses are registered according to each user of the plural image forming apparatuses, and an apparatus coordination unit to perform a job by utilizing a function of the first one of the image forming apparatuses and a function of at least the second one of the image forming apparatuses; and a selection receiving unit to receive information indicative of the at least second one of the image forming apparatuses and information indicative of the function of the at least second one of the image forming apparatuses.

15. The system as claimed in claim 14, wherein a record of the display-purpose user information generated by the user information integration unit includes link information that links the remote image forming apparatus user information included in the display-purpose user information to the second one of the image forming apparatuses, wherein upon receiving an entered updated attribute of the remote image forming apparatus user information, the user information integration unit updates the display-purpose user information with the updated attribute, followed by identifying, based on the link information, the second one of the image forming apparatuses that stores the remote-apparatus user information corresponding to the updated attribute, and then transmitting to the identified second one of the image forming apparatuses the updated attribute and user identification information used by the identified second one of the image forming apparatuses together with a request to update the remote image forming apparatus user information and the display-purpose user information generated by the second one of the image forming apparatuses, and wherein a user information integration unit of the second one of the image forming apparatuses requests a third one of the image forming apparatuses to update display-purpose user information generated by the third one of the image forming apparatus.

* * * * *